(12) United States Patent
Zhang et al.

(10) Patent No.: US 8,898,729 B2
(45) Date of Patent: Nov. 25, 2014

(54) METHOD AND APPARATUS FOR SECURITY ALGORITHM SELECTION PROCESSING, NETWORK ENTITY, AND COMMUNICATION SYSTEM

(75) Inventors: Aiqin Zhang, Shanghai (CN); Jing Chen, Shenzhen (CN); Yi Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 13/251,595

(22) Filed: Oct. 3, 2011

(65) Prior Publication Data

US 2012/0066737 A1 Mar. 15, 2012

Related U.S. Application Data

(63) Continuation of application No. PCT/CN2010/071522, filed on Apr. 2, 2010.

(30) Foreign Application Priority Data

Apr. 3, 2009 (CN) .......................... 2009 1 0081161

(51) Int. Cl.
*H04L 29/06* (2006.01)
*H04W 12/00* (2009.01)

(52) U.S. Cl.
CPC .............. *H04L 63/20* (2013.01); *H04L 63/205* (2013.01); *H04W 12/00* (2013.01)
USPC .................. 726/1; 726/14; 713/168; 713/169

(58) Field of Classification Search
CPC ......... H04L 63/20; H04L 12/00; H04L 12/22; H04L 63/205

USPC ................................. 726/1, 14; 713/168, 169
See application file for complete search history.

(56) References Cited

U.S. PATENT DOCUMENTS

| 6,941,459 | B1 | 9/2005 | Hind et al. |
| 2006/0026671 | A1 | 2/2006 | Potter et al. |
| 2008/0267405 | A1* | 10/2008 | Vialen et al. .................. 380/270 |

FOREIGN PATENT DOCUMENTS

| CN | 1773904 | 5/2006 |
| CN | 1835436 | 9/2006 |

(Continued)

OTHER PUBLICATIONS

CN 1773904 A (Zhang, Ye et al.) May 17, 2006 (computer-generated translation into English).*

(Continued)

*Primary Examiner* — Justin T Darrow
(74) *Attorney, Agent, or Firm* — Staas & Halsey LLP

(57) ABSTRACT

Embodiments of the present invention disclose a method and an apparatus for security algorithm selection processing, a network entity, and a communication system. The method includes: receiving a service request message sent by user equipment; and according to a security protection requirement of the service request message, selecting a security algorithm from a security algorithm list supported by both the user equipment and a network entity, where security algorithm lists supported by the user equipment and/or the network entity are set separately based on different security protection requirements, or security algorithm lists supported by the user equipment and the network entity are used for indicating security capability of the user equipment and the network entity respectively.

21 Claims, 18 Drawing Sheets
(1 of 18 Drawing Sheet(s) Filed in Color)

(56) References Cited

FOREIGN PATENT DOCUMENTS

| CN | 101170811 | 4/2008 |
|---|---|---|
| CN | 101242629 | 8/2008 |
| CN | 101262337 | 9/2008 |
| CN | 101330376 | 12/2008 |
| CN | 101378591 | 3/2009 |
| EP | 1 860 906 | 11/2007 |
| EP | 1860906 A1 | 11/2007 |
| EP | 1895706 | 3/2008 |

OTHER PUBLICATIONS

Written Opinion of the International Searching Authority, mailed Jul. 8, 2010, in corresponding International Application No. PCT/CN2010/071522 (8 pp.).

Office Action, mailed Dec. 7, 2011, in corresponding Chinese Application No. 200910081161.7 (20 pp.).

Extended European Search Report dated Mar. 19, 2012 issued in corresponding European Patent Application No. 10758066.4.

"$3^{rd}$ Generation Partnership Project; Technical Specification Group Services and System Aspects; Rationale and track security decisions in Long Term, Evolved (LTE) RAN/3GPP System Architecture Evolution (SAE) (Release 7)", 3GPP TR 33.821 V0.1.0, Feb. 2007, pp. 1-84.

International Search Report, mailed Jul. 8, 2010, in International Application No. PCT/CN2010/071522.

Office Action issued Aug. 23, 2012 in corresponding Chinese Patent Application No. 200910081161.7 (10 pages) (8 pages English translation).

Third Chinese Office Action mailed Feb. 8, 2013 in corresponding Chinese Patent Application No. 200910081161.7 (10 pages) (12 pages English Translation).

* cited by examiner

US 8,898,729 B2

METHOD AND APPARATUS FOR SECURITY ALGORITHM SELECTION PROCESSING, NETWORK ENTITY, AND COMMUNICATION SYSTEM

CROSS-REFERENCE TO RELATED APPLICATIONS

This application is a continuation of International Application No. PCT/CN2010/071522, filed on Apr. 2, 2010, which claims priority to Chinese Patent Application No. 200910081161.7, filed on Apr. 3, 2009, both of which are hereby incorporated by reference in their entireties.

FIELD OF THE INVENTION

The present invention relates to communication technologies, and in particular, to a method and an apparatus for security algorithm selection processing, a network entity, and a communication system.

BACKGROUND OF THE INVENTION

Long Term Evolution (Long Term Evolution, hereinafter referred to as LIE) is a next evolution target of a mobile broadband network standard defined by the Third Generation Partnership Project (Third Generation Partnership Project, hereinafter referred to as 3GPP), which supports operation on paired spectra and unpaired spectra, and may utilize existing and future wireless bands efficiently. FIG. 1 is a schematic structural diagram of an Evolved Universal mobile telecommunications system Terrestrial Radio Access Network (Evolved UMTS Terrestrial Radio Access Network, hereinafter referred to as E-UTRAN) of an access network part in an LTE system. Data interaction and signaling interaction are implemented between Evolved NodeBs (Evolved NodeBs, hereinafter referred to as eNBs) through an X2 interface. An eNB is connected to a Mobility Management Entity (Mobility Management Entity, hereinafter referred to as MME) in an Evolved Packet Core (Evolved Packet Core, hereinafter referred to as EPC) network through an S1 interface; and the eNB is connected to a Serving Gateway (Serving Gateway, hereinafter referred to as S-GW) through the S1 interface.

FIG. 2 is a schematic diagram of a security architecture of an LTE System Architecture Evolution (LTE System Architecture Evolution, hereinafter referred to as LTE-SAE) system. The LTE-SAE system has the following two layers security protection: One layer is an Access Stratum (Access Stratum, hereinafter referred to as AS) between User Equipment (User Equipment, hereinafter referred to as UE) and the eNB, which is mainly configured to provide security protection for Radio Resource Control (Radio Resource Control, hereinafter referred to as RRC) signaling between the UE and the eNB, and for user data on a User Plane (User Plane, hereinafter referred to as UP), including encryption protection and integrity protection for the RRC signaling, and encryption for the user data on the UP; and the other layer is a Non Access Stratum (Non Access Stratum, hereinafter referred to as NAS) between the UE and the MME, which is mainly configured to provide security protection for an NAS signaling between the UE and the MME, including encryption protection and integrity protection for the NAS signaling.

In the LTE-SAE system, capability of a UE includes UE radio capability (UE radio capability) and UE network capability (UE network capability). The UE radio capability is applied between the UE and the eNB, and is primarily embodied in an AS security algorithm list supported by the UE for the AS. It is assumed that a set of algorithms in the AS security algorithm list is represented as $\{A\}$. The UE network capability is applied between the UE and the MME, including security capability of the UE in the NAS, and is embodied in an NAS security algorithm list supported for the NAS. It is assumed that a set of algorithms in the NAS security algorithm list is represented as $\{B\}$. Security protection for data and signaling is started after successful startup of a security mode of the AS and the NAS. After the security mode of the AS and the NAS is started, the UE reports AS security algorithm $\{A\}$ and NAS security algorithm $\{B\}$ to network entities eNB and MME respectively. It is assumed that a security algorithm list of security algorithm supporting capability of the eNB is represented as $\{a\}$, and a security algorithm list of security algorithm supporting capability of the MME is represented as $\{b\}$. The eNB selects security algorithms of the AS from $\{\{A\}\cap\{a\}\}$, and the selected algorithms include an RRC encryption algorithm, namely, Evolved Packet System (Evolved Packet System, hereinafter referred to as EPS) AS signaling Encryption Algorithm (EPS AS Encryption Algorithm, hereinafter referred to as EAEA), an RRC integrity protection algorithm, namely, EPS AS signaling Integrity protection Algorithm (EPS AS Integrity Algorithm, hereinafter referred to as EAIA), and a user plane encryption algorithm, namely, EPS User-plane Encryption Algorithm (EPS User-plane Encryption Algorithm, hereinafter referred to as EUEA). The MME selects security algorithms of the NAS from $\{\{B\}\cap\{b\}\}$, and the selected algorithms include an EPS NAS Encryption Algorithm (EPS NAS Encryption Algorithm, hereinafter referred to as ENEA), and an EPS NAS Integrity protection Algorithm (EPS NAS Integrity Algorithm, hereinafter referred to as ENIA).

In the UE, the AS security algorithm list is the same as the NAS security algorithm list, that is, set $\{A\}$=set $\{B\}$. When the AS security algorithm list in the UE includes the security algorithm list of the eNB, and the NAS security algorithm list in the UE includes the security algorithm list of the MME, that is, when $\{a\}$ is included in $\{A\}$, and $\{b\}$ is included in $\{B\}$, the AS security algorithms selected by the eNB may be the same as the NAS security algorithms selected by the MME; and moreover, the AS security algorithm list in the UE includes the RRC signaling security algorithm and a UP security algorithm. Therefore, the RRC signaling security algorithm selected according to the prior art is the same as the UP security algorithm. In the LTE-SAE system, the UE and the network entity may support multiple types of security algorithms, and complexity and overheads of different security algorithms are different. Generally, algorithms with higher security level have a greater overhead and complexity. Different data types, service types and user requirements may require different security algorithms, or even no security protection is required. Therefore, it is not necessary to apply the same security algorithm to all services. However, in the prior art, based on different data types, service types and user requirements, the network entities eNB and MME cannot select a corresponding AS security algorithm and NAS security algorithm, and therefore, different security protection for the corresponding service cannot be performed according to different data types, service types and user requirements.

SUMMARY OF THE INVENTION

An objective of embodiments of the present invention is: to provide a method and an apparatus for security algorithm selection processing, a network entity, and a communication system so as to select different security algorithms to perform security protection for different services.

An embodiment of the present invention provides a method for security algorithm selection processing, including:

receiving a service request message sent by user equipment; and according to a security protection requirement of the service request message, selecting a security algorithm from a security algorithm list supported by both the user equipment and a network entity, where security algorithm lists supported by the user equipment and/or the network entity are set separately based on different security protection requirements, or, security algorithm lists supported by the user equipment and the network entity are used for indicating security capability of the user equipment and the network entity respectively.

An embodiment of the present invention provides an apparatus for security algorithm selection processing, including:

a first obtaining module, configured to obtain a security protection requirement of a service request message sent by user equipment;

a first selecting module, configured to: according to the security protection requirement of the service request message, select a security algorithm from a security algorithm list supported by both the user equipment and a network entity, where security algorithm lists supported by the user equipment and/or the network entity are set separately based on different security protection requirements, or, security algorithm lists supported by the user equipment and the network entity are used for indicating security capability of the user equipment and the network entity respectively.

An embodiment of the present invention provides a communication system, which includes a network entity, and further includes an apparatus for security algorithm selection processing. The apparatus for security algorithm selection processing is configured to: obtain a security protection requirement of a service request message sent by user equipment; and according to the security protection requirement of the service request message, select a security algorithm from a security algorithm list supported by both the user equipment and the network entity, where security algorithm lists supported by the user equipment and/or the network entity are set separately based on different security protection requirements, or, security algorithm lists supported by the user equipment and the network entity are used for indicating security capability of the user equipment and the network entity respectively.

Based on the method for security algorithm selection processing, an apparatus for security algorithm selection processing, and the communication system provided in the preceding embodiment of the present invention, because security algorithm lists supported by the user equipment and/or the network entity (for example, an eNB and an MME) are set separately based on different security protection requirements, different security algorithms may be selected according to security protection requirements of different service request messages so as to perform different security protection for the corresponding service, which improves security of the service. In addition, in the communication system, complexity of each algorithm and an overhead occupied by each algorithm may further be considered comprehensively, and therefore, performance of the communication system is improved when effective security protection is performed on the service.

An embodiment of the present invention provides a kind of user equipment, including:

a first storage module, configured to store a security algorithm list supported by the user equipment, where the security algorithm list is set separately based on different security protection requirements, or is used for indicating security capability of the user equipment;

a second obtaining module, configured to obtain the security algorithm list from the first storage module, or, query a security protection requirement of a service request message and obtain a security algorithm list corresponding to the security protection requirement from the first storage module;

a first sending module, configured to generate and send a service request message to a network entity, where the service request message includes the security algorithm list obtained by the second obtaining module; and a first receiving module, configured to receive a security algorithm returned by the network entity, where the security algorithm is selected, according to the security protection requirement of the service request message, from a security algorithm list supported by both the user equipment and the network entity.

An embodiment of the present invention provides a network entity, including:

a second storage module, configured to store a security algorithm list or a security algorithm selection policy, where the security algorithm list or the security algorithm selection policy is supported by the network entity. The security algorithm list is set separately based on different security protection requirements, or is used for indicating security capability of the network entity, and the security algorithm selection policy is set based on the security algorithm list that is supported by the network entity;

a second receiving module, configured to receive a service request message sent by user equipment, where the service request message includes a security algorithm list supported by the user equipment;

a second selecting module, configured to, according to the security algorithm list or the security algorithm selection policy stored in the second storage module, and the security algorithm list in the service request message, select a security algorithm corresponding to a security protection requirement from a security algorithm list supported by both the user equipment and the network entity; and a second sending module, configured to send the security algorithm selected by the second selecting module to the user equipment.

Another communication system provided in an embodiment of the present invention includes a network entity. The network entity stores a security algorithm list or a security algorithm selection policy, where the security algorithm list or the security algorithm selection policy is supported by the network entity. The security algorithm list is set separately based on different security protection requirements, or is used for indicating security capability of the network entity, and the security algorithm selection policy is set based on the security algorithm list that is supported by the network entity; and The network entity is configured to: receive a service request message sent by user equipment, where the service request message includes a security algorithm list supported by the user equipment or a security algorithm list corresponding to a security protection requirement of the service request message; and according to the security algorithm list or the security algorithm selection policy, where the security algorithm list or the security algorithm selection policy is supported by the network entity, and the security algorithm list carried in the service request message, select a security algorithm corresponding to the security protection requirement from a security algorithm list supported by both the user equipment and the network entity; and send the selected security algorithm to the user equipment.

Based on the user equipment, network entity and another communication system provided in the preceding embodiment of the present invention, because the security algorithm lists supported by the user equipment and/or network entity are set separately based on different security protection requirements, after the user equipment sends all security algorithm lists supported by the user equipment, or the security algorithm list corresponding to the security protection requirement of the service request message to the network entity, the network entity may select a security algorithm corresponding to the security protection requirement of the service request message among security algorithms supported by the user equipment and the network entity, so as to perform corresponding security protection on the service subsequently. In this way, service security is improved. In addition, in the communication system, complexity of each algorithm and an overhead occupied by each algorithm may further be considered comprehensively, and therefore, performance of the communication system is improved when effective security protection is performed on the service.

An embodiment of the present invention provides another user equipment, including:

a first storage module, configured to store a security algorithm list supported by the user equipment, where the security algorithm list is set separately based on different security protection requirements, or is used for indicating security capability of the user equipment;

a first sending module, configured to generate and send a service request message to a network entity;

a first receiving module, configured to receive a security algorithm list, a security algorithm selection policy, or a security algorithm selection policy identifier, where the security algorithm list, the security algorithm selection policy, or the security algorithm selection policy identifier is returned by the network entity. The security algorithm list is a security algorithm list supported by the network entity, or a security algorithm list corresponding to a security protection requirement of the service request message in the security algorithm list, and the security algorithm selection policy is set based on the security algorithm list supported by the network entity; and a third selecting module, configured to, according to the security algorithm list stored in the first storage module, and the security algorithm list received by the first receiving module, select a security algorithm corresponding to the security protection requirement from a security algorithm list supported by both the user equipment and the network entity.

An embodiment of the present invention provides another network entity, including:

a second storage module, configured to store a security algorithm list, a security algorithm selection policy, or a security algorithm selection policy identifier, where the security algorithm list, the security algorithm selection policy, or the security algorithm selection policy identifier is supported by the network entity. The security algorithm list is set separately based on different security protection requirements, or is used for indicating security capability of the network entity, and the security algorithm selection policy is set based on the security algorithm list supported by the network entity;

a second receiving module, configured to receive a service request message sent by user equipment; and a fourth sending module, configured to send to the user equipment: the security algorithm list stored in the second storage module, a security algorithm list corresponding to a security protection requirement of the service request message, the security algorithm selection policy, or the security algorithm selection policy identifier.

Another communication system provided in an embodiment of the present invention includes a network entity. The network entity stores a security algorithm list, a security algorithm selection policy, or a security algorithm selection policy identifier, where the security algorithm list, the security algorithm selection policy, or the security algorithm selection policy identifier is supported by the network entity. The security algorithm list is set separately based on different security protection requirements to indicate security capability of the user equipment or the network entity correspondingly, and the security algorithm selection policy is set based on the security algorithm list that is supported by the network entity; and The network entity is configured to: receive a service request message sent by the user equipment; and send to the user equipment: the security algorithm list stored in the network entity, a security algorithm list corresponding to a security protection requirement, the security algorithm selection policy, or the security algorithm selection policy identifier, so that the user equipment selects a security algorithm corresponding to the security protection requirement according to the security algorithm list stored in the user equipment, and one of the following: the security algorithm list, the security algorithm selection policy, and the security algorithm selection policy identifier which are returned by the network entity.

Based on another user equipment, network entity and communication system provided in the preceding embodiment of the present invention, because security algorithm lists supported by the user equipment and/or the network entity are set separately based on different security protection requirements, after receiving a service request message sent by the user equipment, the network entity may return all security algorithm lists supported by the network entity or a security algorithm list corresponding to a security protection requirement of the service request message to the user equipment, so that the user equipment selects a security algorithm corresponding to the security protection requirement of the service request message among security algorithms supported by the user equipment and the network entity, so as to perform corresponding security protection on the service subsequently. In this way, service security is improved. In addition, in the communication system, complexity of each algorithm and an overhead occupied by each algorithm may be further considered comprehensively, and therefore, performance of the communication system is improved when effective security protection is provided on the service.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE EMBODIMENTS

Figure 1:
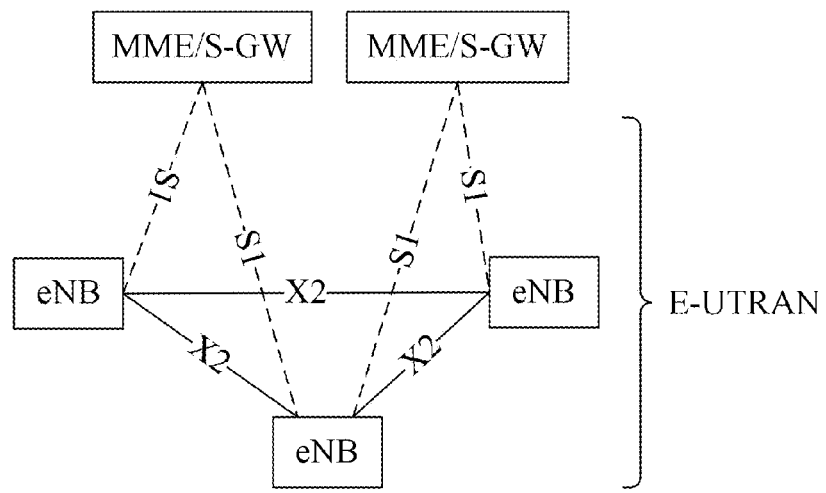
FIG. 1 is a schematic structural diagram of an E-UTRAN that serves as an access network part in an LTE system.
Figure 2:
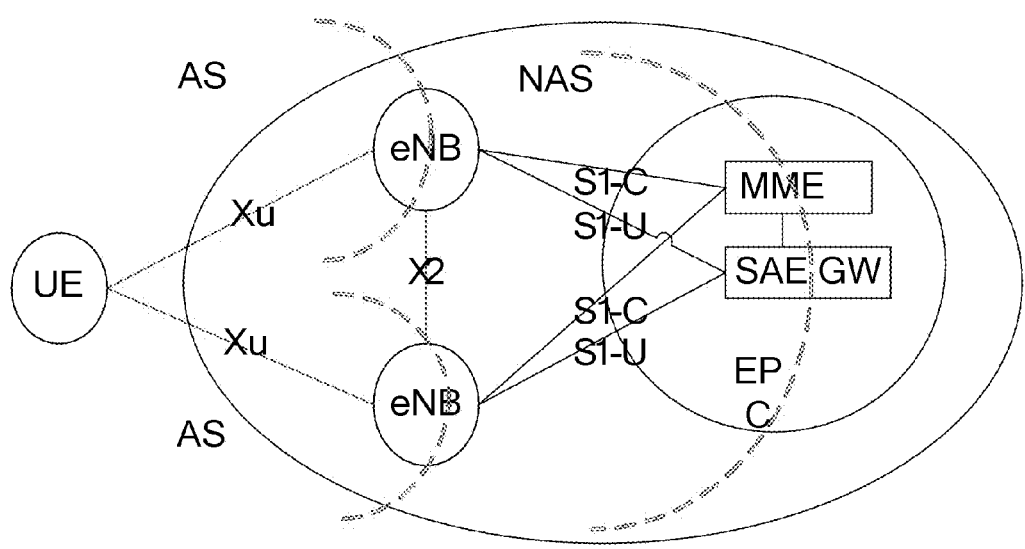
FIG. 2 is a schematic diagram of a security architecture of an LTE-SAE system.
Figure 3:
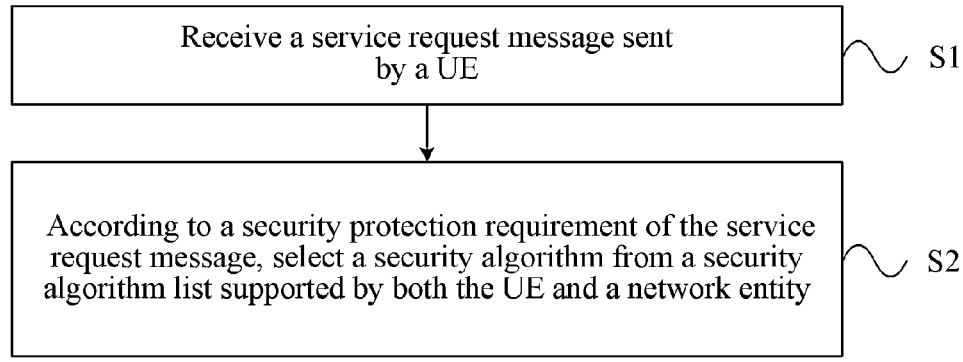
FIG. 3 is a flowchart of a method for security algorithm selection processing according to an embodiment of the present invention.

As shown in FIG. 3, a method for security algorithm selection processing in an embodiment of the present invention includes:

S1: Receive a service request message sent by a UE; and

S2: According to a security protection requirement of the service request message, select a security algorithm from a security algorithm list supported by both the UE and a network entity.

Security algorithm lists supported by the UE and/or the network entity are set separately based on different security protection requirements, or, security algorithm lists supported by the UE and the network entity are used for indicating security capability of the UE and the network entity respectively. Because the security algorithm lists supported by the user equipment and/or the network entity are set separately based on different security protection requirements, different security algorithms may be selected according to security protection requirements of different service request messages so as to perform different security protection for the corresponding service, which improves security of the service. In addition, in a communication system, complexity of each algorithm and an overhead occupied by each algorithm may further be considered comprehensively, performance of the communication system is improved when effective security protection is performed on the service.

The security protection requirements may include: a data type, a service type, and any one of or a plurality of user requirements, for example, a security protection level requirement or security algorithm list, where the security protection level requirement or security algorithm list is corresponding to the data type; and one of the following: a security protection level requirement, a security algorithm list, and a security algorithm policy which are corresponding to the service type. The security algorithm policy corresponding to the service type is used for indicating the security protection level requirement of the service type under different conditions. Specifically, the data type may be an RRC signaling, user data of a UP, or NAS signaling. The security algorithm may be an RRC encryption algorithm, an RRC integrity protection algorithm, a UP encryption algorithm, a UP integrity protection algorithm, an NAS encryption algorithm, or an NAS integrity algorithm.

As an embodiment of the present invention, the security algorithm list supported by the UE includes a radio security capability (Radio Capability) algorithm list and a network security protection capability (Network Capability) algorithm list of the UE. The service request message sent by the UE may be a service request message, Service Request, or an attach request message, Attach Request.

In this embodiment of the present invention, for security capability of the UE, for example, an algorithm capability set, different algorithm capability sets may be respectively defined according to different security protection requirements of different data types, for example, distinguishing signaling from user plane data. In this way, different security protection algorithm lists supported by the UE are provided for different data types or different security protection levels, where the security protection levels include an AS and an NAS. Security capability of a network entity may specifically provide different security protection algorithm lists supported by the network entity for different data types or different security protection levels. Because different security algorithms have different complexity, occupied overheads, and efficiency of encryption/decryption and calculation and check of an integrity authentication code are also different; and data packets and traffic characteristics of different data types are different; and security protection requirements are also different. For example, signaling and user data belong to different data types. In this embodiment of the present invention, based on different security protection requirements of different data types, service types or user requirements, the security capability sets different security algorithm capability sets in the UE and/or network entity. In this way, the UE or network entity may select different security algorithms according to different security protection requirements to perform security protection on the corresponding service, which improves security of the service. In addition, in a communication system, complexity of each algorithm and an overhead occupied by each algorithm may further be considered comprehensively, and therefore, performance of the communication system is improved when effective security protection is performed on the service.

In the prior art, no integrity protection is performed on user data of a UP due to large amount of data, too large overheads occupied by an integrity algorithm, and too much impact on system performance. However, on some occasions, for example, on a higher security level required occasion where tamper is prevented and normal transmission of data needs to be ensured accurately, actual data integrity protection is also required. Or, based on a limitation of performance of a security algorithm with a high security level, according to inherent characteristics of the security algorithm, for example, complexity and an occupied overhead, in this embodiment of the present invention, a corresponding security algorithm list may be preset according to a security protection requirement subscribed to by a user. In this way, integrity protection may be performed on user data of a corresponding UP by adopting a proper integrity protection algorithm, for example, an integrity algorithm that involves a lower amount of calculation, or a method of checking integrity of a specific part of data.

In this embodiment of the present invention, the network entity may be an eNB or an MME. When the network entity is an Evolved NodeB eNB, a corresponding service request message is an RRC request message or user data of a UP, and the receiving of the service request message sent by the UE specifically is: The eNB receives an RRC request message or user data of a UP, where the RRC request message or user data of the UP is sent by the UE. When the network entity is an MME, the corresponding service request message is an NAS request message, and the receiving of the service request message sent by the UE specifically is: The MME receives an NAS request message that is sent by the UE and forwarded by the eNB.

Specifically, when selecting a security algorithm corresponding to a security protection requirement of the service request message from a security algorithm list supported by both the UE and the network entity, if multiple security algorithms corresponding to the security protection requirement of the service request message exist in the security algorithm list supported by both the UE and the network entity, a security algorithm used for protecting the service may be selected among satisfied security algorithms according to a preset priority order. The preset priority order may be included in the security algorithm list, or a priority order of each security algorithm in the security algorithm list may be stored in a location outside the security algorithm list.

Before the method for security algorithm selection processing in this embodiment of the present invention, in the UE and/or network entity, different security algorithm lists may be respectively set according to different security protection requirements, and according to actual requirements, the security algorithm list in the UE and/or network entity may be added, deleted or updated.

Through this embodiment of the present invention, after a security algorithm corresponding to the security protection requirement of the service request message is selected from the security algorithm list supported by both the UE and the network entity, between the UE and the network entity, for example, between the UE and the eNB, or between the UE and the MME, security protection may be performed on a service according to the selected security algorithm.

Specifically, in an LTE-SAE system, after the eNB selects an RRC encryption algorithm, an RRC integrity protection algorithm, a UP encryption algorithm, and a UP integrity protection algorithm from the security algorithm list supported by both the eNB and the UE, the eNB sends an integrity-protected AS security mode command to the UE, where key identifiers KSlasme, EAEA, EAIA, EUEA, and AS message integrity protection authentication codes (AS Message Authentication Codes, hereinafter referred to as AS-MAC) are carried. The UE enters an AS security mode, and returns an integrity-protected AS security mode response to the eNB, where the AS-MAC is carried. In this way, the AS security mode is started. After the AS security mode is started successfully, security protection is performed on data and signaling through the security protection algorithm selected by the eNB. After the MME selects an ENEA and an ENIA from the security algorithm list supported by both the MME and the UE, the MME sends an integrity-protected NAS security mode command to the UE, where key identifiers KSlasme, EAEA, EAIA, and NAS message integrity protection authentication codes (NAS Message Authentication Codes, hereinafter referred to as NAS-MAC) are carried. The UE enters an NAS security mode, and returns an integrity-protected NAS security mode response to the MME, where the NAS-MAC is carried. In this way, the NAS security mode is started. After the NAS security mode is started successfully, security protection is performed on the data and signaling through the security protection algorithm selected by the MME.

Figure 4:
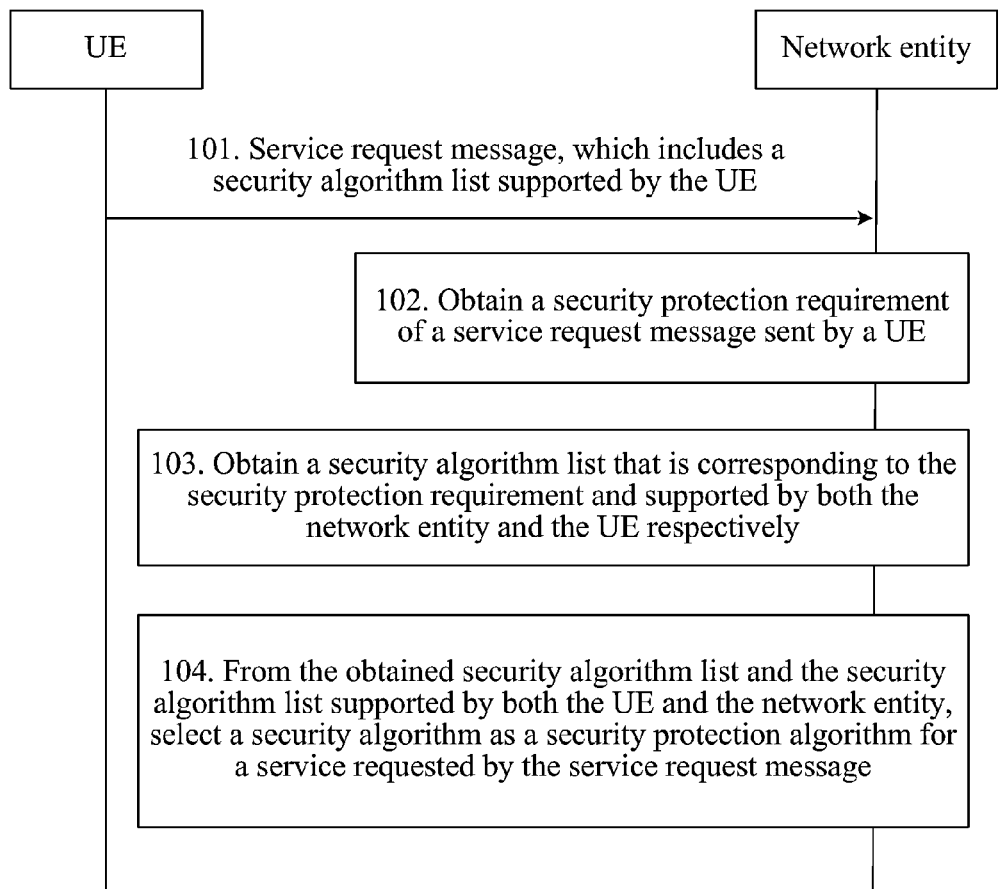
FIG. 4 is a flowchart of a method for security algorithm selection processing according to an embodiment of the present invention.

FIG. 4 is a flowchart of a method for security algorithm selection processing according to an embodiment of the present invention. The method includes the following steps:

Step 101: A network entity receives a service request message sent by a UE, where the service request message includes a security algorithm list supported by the UE.

The network entity may be an eNB or an MME. If the network entity is an eNB, the eNB may exchange information with the UE, and obtains the security algorithm list supported by the UE from the UE directly. In addition, the UE may also send the security algorithm list supported by the UE to the MME, and the eNB obtains the security algorithm list supported by the UE from the MME. If the network entity is an MME, the MME exchanges information with the UE through the eNB. Therefore, first the UE sends a service request message to the eNB, and then the eNB forwards the service request message to the MME. A message sending procedure in other embodiments is similar to that in this embodiment, which is not described again.

In addition, the service request message in step 101 may include no security algorithm list supported by the UE, but the security algorithm list supported by the UE is stored beforehand by the network entity, or provided by information about security capability of the UE, where the information about security capability of the UE is stored in an application server.

Step 102: According to information about a preset mapping relationship between the service request message and a security protection requirement, the network entity obtains the security protection requirement of the service request message sent by the UE.

Step 103: The network entity obtains a security algorithm list corresponding to the security protection requirement from a security algorithm list supported by the network entity, and obtains a security algorithm list corresponding to the security protection requirement from the security algorithm list supported by the UE.

Specifically, if only one security algorithm list in the network entity and the UE is set separately based on different security protection requirements, operations in step 103 are performed for only the UE or the network entity in which the security algorithm list is set separately based on different security protection requirements, however, it is considered that security algorithms in the security algorithm list are applicable to all security protection requirements, where the security algorithm list is not set separately based on different security protection requirements. In other words, whatever security protection requirement is, for the security protection requirement, the security algorithms obtained from the UE or the network entity in which the security algorithm list is not set separately based on different security protection requirements are all security algorithm lists in the UE or the network entity, which are similar to that in other embodiments. For example, it is assumed that a security algorithm list supported by the UE includes three kinds of algorithms: A, B, and C, and the security algorithm list is not set separately based on different security protection requirements; and a security algorithm list supported by the network entity includes five kinds of algorithms: A, B, D, E, and F, and in the security algorithm list, security algorithms A and B correspond to a first user requirement, security algorithms D, E and F correspond to a second user requirement. If the security protection requirement of the service request message sent by the user equipment is the first user requirement, the security algorithms corresponding to the first user requirement in the security algorithm list stored in the UE are all security algorithms in the list of security algorithms supported by the UE, namely, A, B, and C; and the security algorithms that are obtained from the network entity and are corresponding to the first user requirement are A and B.

Step 104: From the obtained security algorithm list and the security algorithm list supported by both the UE and the network entity, the network entity selects an algorithm as a security protection algorithm for the service requested by the service request message.

According to the instance in step 103, A or B may be selected as a security protection algorithm for the service requested by the service request message. If a priority order between security algorithm A and security algorithm B is preset, according to the priority order, A or B is selected as the security protection algorithm for the service requested by the service request message. Otherwise, according to other rules, or at random, A or B may be selected as the security protection algorithm for the service requested by the service request message.

In the embodiment shown in FIG. 4, the service request message sent by the UE to the network entity carries a security algorithm list supported by the UE, and the network entity selects a corresponding security protection algorithm according to the security algorithm list supported by the UE and the security algorithm list supported by the network entity directly. This procedure involves few modifications to that in the prior art, and is simple and easy to be implemented.

In this embodiment of the present invention, there may be no time sequence relationship between step 104 and step 103. For example, step 104 may be executed before or at the same time with step 103. For example, first the security algorithms supported by both the UE and the network entity may be selected through step 104, and then the security algorithm corresponding to the security protection requirement of the service request message is selected among the security algorithms. Alternatively, based on the embodiment of step 103, the security algorithms supported by both the UE and the network entity are selected from the security algorithm list of the UE and the security algorithm list of the network entity, where the security algorithms are A and B; and then the security algorithm corresponding to the first user requirement is selected from the algorithms A and B: A and B; afterward, according to the preset priority order or at random, A or B may be selected as the security protection algorithm for the service requested by the service request message. As a specific application of this embodiment of the present invention, it is assumed that the security algorithm list supported by the UE is shown in Table 1. An identifier in a signaling protocol includes an abbreviation of the length of a key supported by the security algorithm and the name of the security algorithm. For example, "128-EEA0" means that the length of a key supported by a security algorithm that is named "Null ciphering algorithm" is 128, and the name of the security algorithm is abbreviated as EEA0. "✓" means that the security algorithm is applicable to a service, and "x" means that the security algorithm is not applicable to a service. According to Table 1, security algorithms "Null ciphering" and "AES" are applicable to an RRC encryption service, and a security algorithm "SNOW 3G" is not applicable to the RRC encryption service. That is, for the RRC encryption algorithm, the UE supports the security algorithms "Null ciphering" and "AES". Furthermore, security algorithms may be allocated with security algorithm numbers according to the priority order of selecting the security algorithms. That is, from various algorithms corresponding to a security protection requirement, an algorithm with a smaller number or with a larger number may be selected preferentially as an algorithm for security protection for a corresponding service.

TABLE 1

Security algorithm list supported by UE

| Number of security algorithm | Identifier in signaling protocol | Name of security algorithm | RRC encryption | ... | UP encryption |
|---|---|---|---|---|---|
| "00002" | 128-EEA0 | Null ciphering algorithm | ✓ | ... | x |
| "00012" | 128-EEA1 | SNOW 3G | x | ... | ✓ |
| "00102" | 128-EEA2 | AES | ✓ | ... | ✓ |

Table 2 shows a list of security algorithms supported by the eNB. The security algorithms supported by the eNB are applicable to security protection requirements of all services. That is, the security algorithm list supported by the eNB is not set separately based on different security protection requirements.

TABLE 2

Security algorithm list supported by eNB

| Number of security algorithm | Identifier in signaling protocol | Name of security algorithm |
|---|---|---|
| "00002" | 128-EEA0 | Null ciphering algorithm |
| "00012" | 128-EEA1 | SNOW 3G |
| "00102" | 128-EEA2 | AES |

For the security protection requirements in Table 1 and Table 2, only data type is taken as an example. If the service request message that is received by the network entity and sent by the UE is an RRC request message, it is determined that the data type is an RRC signaling. According to step 103, in the RRC request message, the security algorithm list selected from the security algorithm list supported by the UE includes the security algorithms "Null ciphering" and "AES"; and the security algorithm list selected from the security algorithm list supported by the eNB includes the security algorithms "Null ciphering", "SNOW 3G", and "AES". Therefore, the eNB may select one of the security algorithms "Null ciphering" and "AES" as an encryption algorithm of the RRC signaling. If the security algorithms in Table 1 and Table 2 are arranged in a high-to-low priority order, the eNB selects the "Null ciphering" which has higher priority from the "Null ciphering" and "AES" as an encryption algorithm of the RRC signaling. For user data of the UP, the security algorithm "SNOW 3G" is selected. In this way, different multiple security algorithms are selected for the user data of the UP and the RRC signaling. In each embodiment of the present invention, if arranging priority orders of security algorithms conflict between the network entity and the UE, according to presetting, selection may be performed in a priority order in the UE or in the network entity, or no security algorithm with a conflicted priority order is selected, or the selection of the security algorithm is ended directly.

In addition, before step 101, according to a security protection requirement of a service request message to be sent by the UE, the UE may select a security algorithm list corresponding to the security protection requirement from the security algorithm list supported by the UE. Accordingly, in step 101, the service request message includes a security algorithm list that is supported by the UE and is corresponding to the security protection requirement; in step 103, the network entity only needs to obtain a security algorithm corresponding to the obtained security protection requirement from the security algorithm list supported by the network entity. If the security algorithm list in the network entity is not set separately based on different security protection requirements, the network entity obtains the security algorithm list supported by the network entity.

Figure 5:
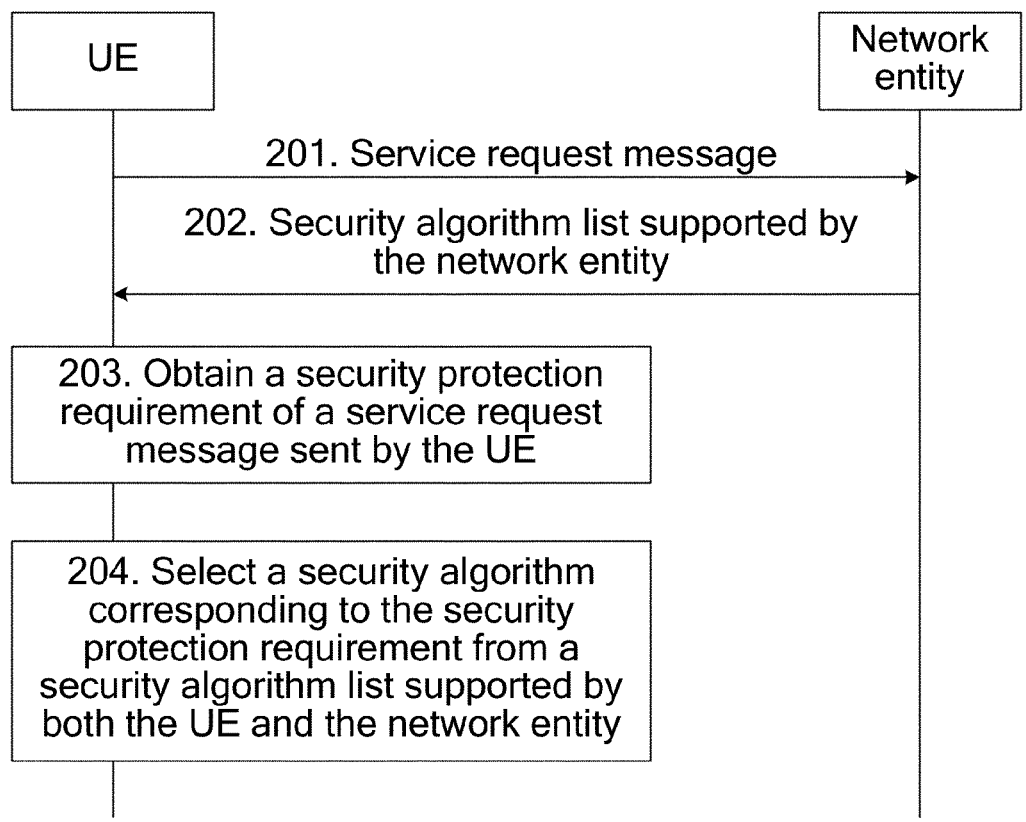
FIG. 5 is a flowchart of a method for security algorithm selection processing according to another embodiment of the present invention.

FIG. 5 is a flowchart of a method for security algorithm selection processing according to another embodiment of the present invention. The method includes the following steps:

Step 201: A network entity receives a service request message sent by a UE.

Step 202: The network entity obtains a security algorithm list supported by the network entity, and sends the security algorithm list to the UE.

Step 203: According to information about a preset mapping relationship between the service request message and a security protection requirement, the UE obtains the security protection requirement of the service request message sent by the UE.

There is no strict time relationship between step 203 and step 202, and step 203 may also be executed at the same time with or before step 202.

Step 204: The UE selects a security algorithm corresponding to the security protection requirement from a security algorithm list supported by both the UE and the network entity.

Specifically, the UE may select a security algorithm corresponding to the security protection requirement from a security algorithm list supported by both the UE and the network entity with reference to the way described in steps 103 to 104.

In the embodiment shown in FIG. 5, after receiving the service request message sent by the UE, the network entity feeds back a security algorithm list supported by the network entity to the UE, and the UE directly selects a corresponding security protection algorithm according to the security algorithm list supported by the UE and the security algorithm list supported by the network entity. The UE does not need to report the security algorithm list supported by the UE to the network entity. Therefore, the security algorithm corresponding to the security protection requirement may be selected more quickly.

Alternatively, after step 201, according to the information about the preset mapping relationship between the service request message and security protection requirement, the network entity may obtain the security protection requirement of the service request message sent by the UE; and obtain a security algorithm list corresponding to the obtained security protection requirement from the security algorithm list supported by the network entity. Accordingly, in step 202, the network entity sends only the obtained security algorithm list corresponding to the security protection requirement to the UE. In step 204, the UE selects a security algorithm as a security protection algorithm for a service requested by the service request message from the security algorithm list that is sent by the network entity and is corresponding to the security protection requirement, and the security algorithm list that is in the UE and is corresponding to the security protection requirement, where the security protection requirement is obtained through step 203.

If the security algorithm list in the UE is not set separately based on different security protection requirements, step 203 does not need to be executed. Accordingly, in step 204, the UE selects a security algorithm as a security protection algorithm for the service requested by the service request message from the security algorithm list that is corresponding to the security protection requirement and is sent by the network entity, and the security algorithm list supported by the UE.

Alternatively, when the network entity stores a security algorithm selection policy, after step 201, the network entity returns the security algorithm selection policy to the UE, where the security algorithm selection policy is supported by the network entity. The security algorithm selection policy is set based on the security algorithm list supported by the network entity. For example, the security algorithm selection policy may be: security algorithms corresponding to various data types, service types, and user requirements in the security algorithm list supported by the network entity, or may further include a priority order of security algorithms. Accordingly, in step 204, according to the security algorithm selection policy sent by the network entity, the UE selects a security algorithm corresponding to the security protection requirement from a security algorithm list supported by both the UE and the network entity.

The network entity may store multiple policies of selecting a security algorithm. Information about these policies, such as a policy name, a policy identifier (identifier, hereinafter referred to as ID), and a security algorithm applicable to a security protection requirement, is synchronous between the user equipment and the network entity. Or, the network entity knows the security algorithm selection policy supported by the UE, and the UE knows the security algorithm selection policy supported by the network entity. When the network entity starts to use a security algorithm, the network entity may send the security algorithm selection policy to the UE through a security protection message, so as to instruct the UE to protect a subsequent communication service by adopting a corresponding security algorithm. Table 3 and Table 4 respectively show a first security algorithm policy and a second security algorithm policy that are stored in the network entity. The security algorithm policy specifies security algorithms applicable to different data types, service types, and user requirements.

TABLE 3

| Security algorithm policy 1 | |
| --- | --- |
| Security protection requirement | Applicable security algorithm |
| Data type 1/service type 1 | Algorithm A |
| Data type 2/service type 2 | Algorithm B |
| Data type 3/service type 3 | Algorithm C |
| Data type 4/service type 4 | Algorithm D |

TABLE 4

| Security algorithm policy 2 | |
| --- | --- |
| Security protection requirement | Applicable security algorithm |
| Data type 1/user AAAAAAA | Algorithm D |
| Data type 2/user CCCCCCC | Algorithm C |
| Data type 3/user EEEEEEE | Algorithm B |
| Data type 4/user XXXXXXX | Algorithm A |

Furthermore, if the security algorithm selection policy stored in the UE is the same as that stored in the network entity, and when the UE and the network entity both store the security algorithm selection policy and an ID of the security algorithm selection policy, in order to reduce network traffic and minimize occupation of network bandwidth resources, the network entity may send to the UE only a security algorithm selection policy ID of the security algorithm selection policy corresponding to the service request message sent by the user equipment. In step 204, the UE determines a security algorithm selection policy identified by the security algorithm selection policy ID that is sent by the network entity, and according to the security algorithm selection policy, selects a security algorithm corresponding to the security protection requirement from a security algorithm list supported by both the UE and the network entity.

To further restrict security algorithms of different security protection requirements and facilitate uniform management and update for selection of a security algorithm, an application server may be set in a communication network. In the application server, a security algorithm list, a security algorithm selection policy, or a security algorithm selection policy ID is set based on different protection requirements respectively. The security algorithm selection policy is set based on a security protection requirement, a setting method may be made reference to the setting method of the security algorithm selection policy in the network entity. Specifically, when a security algorithm of the service requested by the service request message is selected, the security algorithm is selected from a security algorithm list that is supported by both the UE and the network entity, and is stored in the application server. It may be preset that a security algorithm selected by the application server prevails when a security algorithm selected by the UE or network entity conflicts with the security algorithm selected by the application server.

Figure 6:
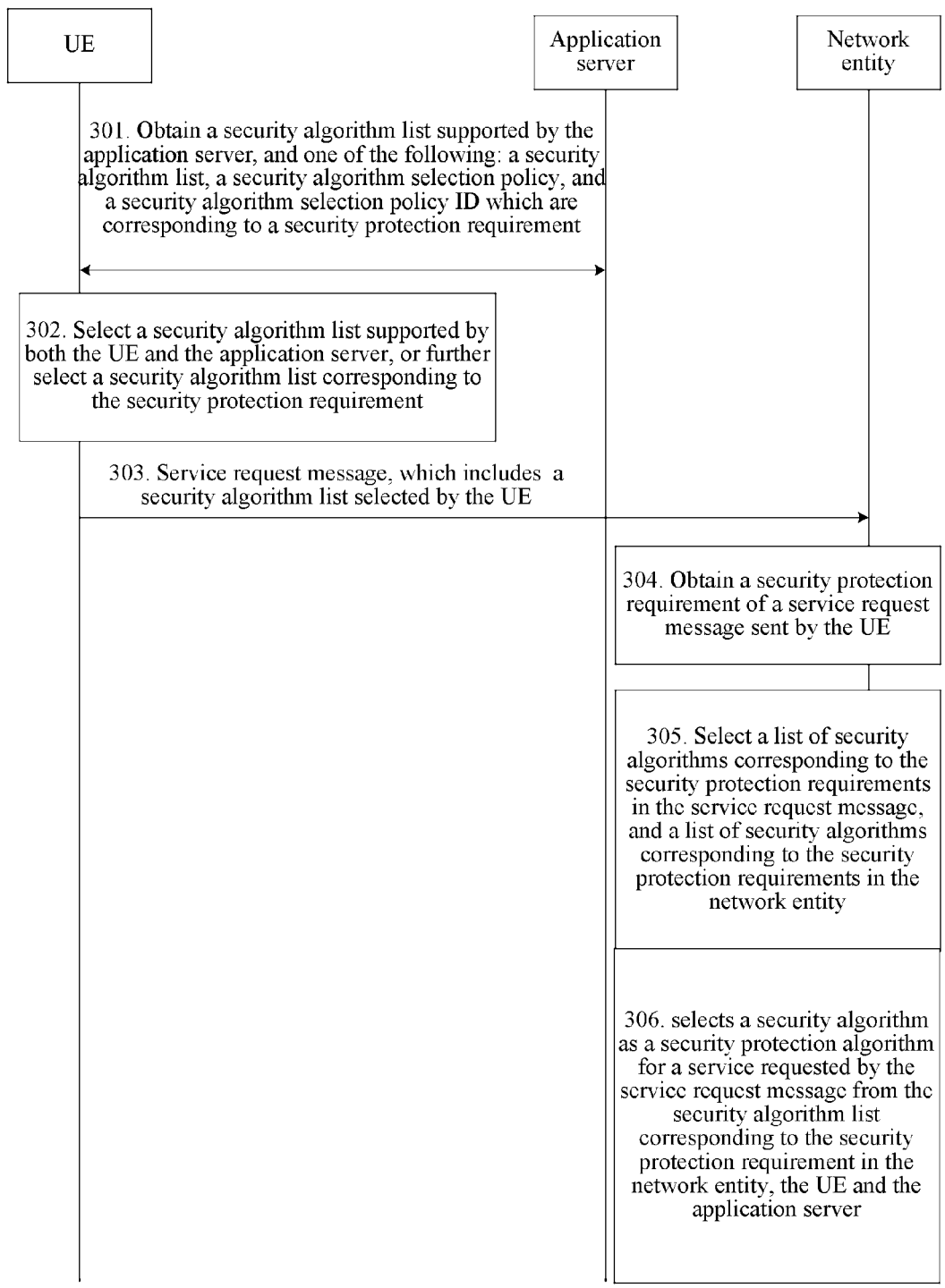
FIG. 6 is a flowchart of a method for security algorithm selection processing according to another embodiment of the present invention.

FIG. 6 is a flowchart of a method for security algorithm selection processing according to another embodiment of the present invention. The method includes the following steps:

Step 301: A UE sends an acquisition request message to an application server to obtain a security algorithm list stored in the application server, or obtain a security algorithm list, or a security algorithm selection policy, or a security algorithm selection policy ID from the former security algorithm list, where the security algorithm list, or the security algorithm selection policy, or the security algorithm selection policy ID is corresponding to a security protection requirement of a service request message to be sent.

Step 302: According to a security algorithm list supported by the UE, and one of the following: the security algorithm list, the security algorithm selection policy, and the security algorithm selection policy ID which are obtained from the application server, accordingly, the UE selects a security algorithm list stored in the application server and supported by the UE, or selects a security algorithm list that is stored in the application server, supported by the UE, and corresponding to the security protection requirement of the service request message.

If the UE obtains the security algorithm selection policy ID from the application server, the UE obtains a corresponding security algorithm selection policy according to a mapping relationship between the security algorithm selection policy and the security algorithm selection policy ID.

Whether the security algorithm list selected by the UE may specifically be a security algorithm list that is supported by the UE, stored in the application server, and corresponding to the security protection requirement of the service request message, or may be a security algorithm list that is supported by the UE and stored in the application server may be preset according to a communication requirement.

Step 303: The UE sends a service request message to the network entity. The service request message includes a security algorithm list selected by the UE, which specifically is a security algorithm list that is supported by the UE and stored in the application server, or a security algorithm list that is supported by the UE, stored in the application server, and corresponding to the security protection requirement of the service request message.

Step 304: According to information about a preset mapping relationship between the service request message and the security protection requirement, the network entity obtains the security protection requirement of the service request message sent by the UE.

Step 305: If the service request message includes the security algorithm list that is supported by the UE, stored in the application server, and corresponding to the security protection requirement of the service request message, the network entity obtains a security algorithm list corresponding to the security protection requirement from the security algorithm list supported by the network entity.

If the service request message includes the security algorithm list that is supported by the UE and stored in the application server, in step 305, the network entity selects a security algorithm list corresponding to the security protection requirement from the former security algorithm list.

Specifically, whether the service request message includes the security algorithm list that is supported by the UE, stored in the application server, and corresponding to the security protection requirement of the service request message, or includes the security algorithm list that is supported by the UE and stored in the application server may be preset according to a communication requirement.

Step 306: The network entity selects a security algorithm as a security protection algorithm for a service requested by the service request message from the security algorithm list that is supported by the network entity and corresponding to the security protection requirement of the service request message, and the security algorithm list selected by the UE in the service request message.

In the embodiment shown in FIG. 6, the UE selects a security algorithm list that is supported by the UE and stored in the application server, or a security algorithm list that is supported by the UE, stored in the application server, and corresponding to the security protection requirement of the service request message, and then sends the list to the network entity, thus reducing network traffic of the UE sending all security algorithm lists supported by the UE and all security algorithm lists stored in the application server. Moreover, when the network entity selects a security algorithm list, the security algorithm list stored in the application server is further considered, which further restricts security algorithms of different security protection requirements, and facilitates uniform management and update for selection of a security algorithm.

Figure 7:
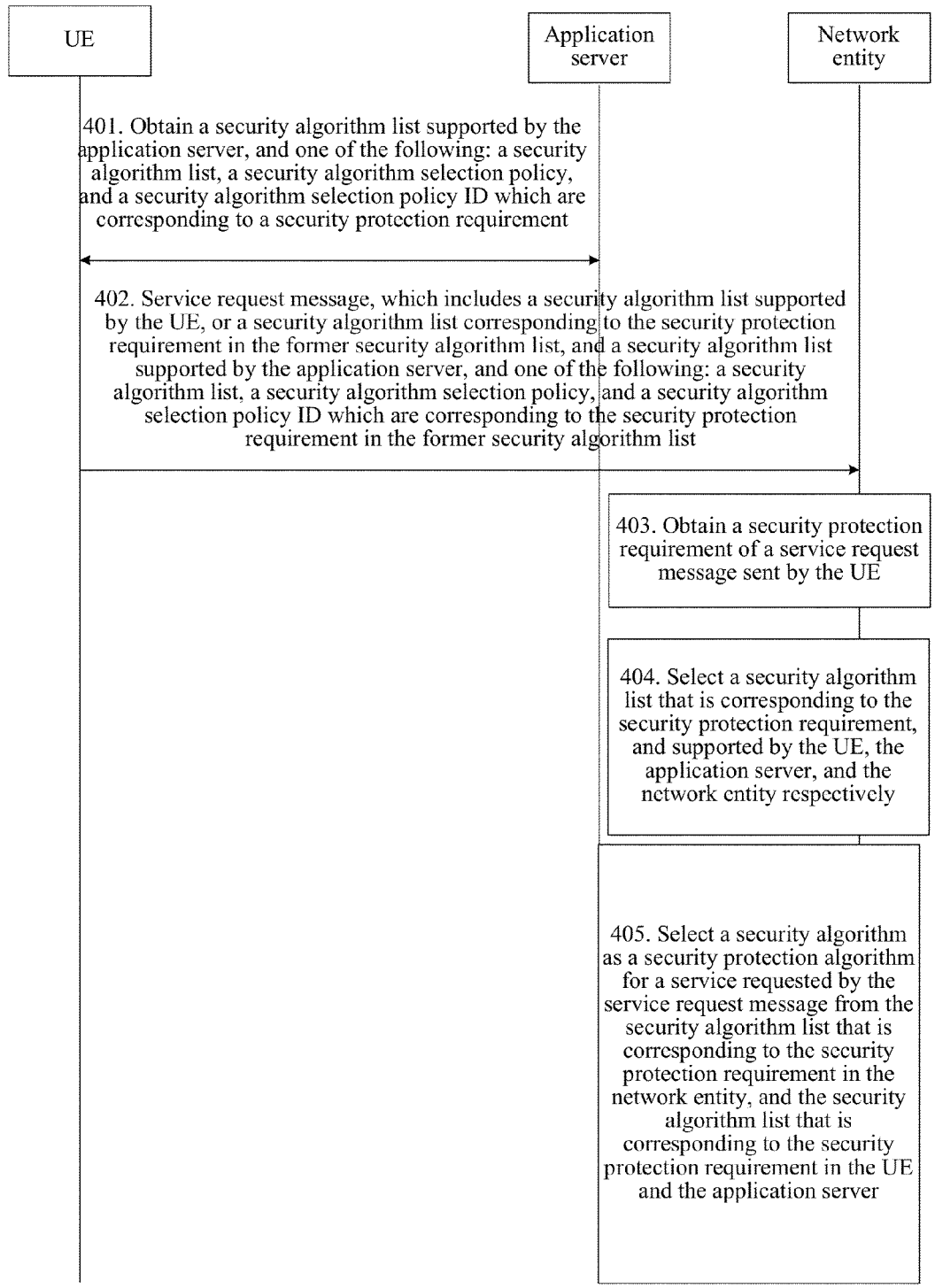
FIG. 7 is a flowchart of a method for security algorithm selection processing according to another embodiment of the present invention.

FIG. 7 is a flowchart of a method for security algorithm selection processing according to another embodiment of the present invention. The method includes the following steps:

Step 401: A UE sends an acquisition request message to an application server to obtain a security algorithm list stored in the application server, or obtain a security algorithm list, or a security algorithm selection policy, or a security algorithm selection policy ID from the former security algorithm list, where the security algorithm list, or the security algorithm selection policy, or the security algorithm selection policy ID is corresponding to a security protection requirement of a service request message to be sent.

Step 402: The UE sends a service request message to the network entity. The service request message includes a security algorithm list supported by the UE; or a security algorithm list corresponding to the security protection requirement of the service request message to be sent in the former security algorithm list and an obtained security algorithm list stored in the application server; or a security algorithm list corresponding to the security protection requirement in the former security algorithm list; or a security algorithm selection policy or a security algorithm selection policy ID.

Specifically, whether the security algorithm list in the service request message is a security algorithm list supported by the UE, or is a security algorithm list corresponding to the security protection requirement of the service request message to be sent in the former security algorithm list; and is a security algorithm list stored in the application server, or is a security algorithm list corresponding to the security protection requirement in the former security algorithm list may be preset according to a communication requirement.

Step 403: According to information about a preset mapping relationship between the service request message and the security protection requirement, the network entity obtains the security protection requirement of the service request message sent by the UE.

Step 404: If the service request message includes the security algorithm list that is supported by the UE, stored in the application server, and corresponding to the security protection requirement, the network entity obtains a security algorithm list corresponding to the security protection requirement from the security algorithm list supported by the network entity.

If the service request message includes the security algorithm list supported by the UE, and one of the following: the security algorithm list, the security algorithm selection policy and the security algorithm selection policy ID which are stored in the application server, in step 404, the network entity further selects a security algorithm list that is stored in the application server and supported by the UE, and a security algorithm list corresponding to the security protection requirement respectively.

If the service request message includes the security algorithm selection policy ID of the application server, the same mapping relationship between the security algorithm selection policy and the security algorithm selection policy ID needs to be preset in the network entity and the application server. The network entity obtains a corresponding security algorithm selection policy according to the security algorithm selection policy ID.

Specifically, whether the service request message includes the security algorithm list that is supported by the UE, stored in the application server, and corresponding to the security protection requirement, or includes the security algorithm list, the security algorithm selection policy or the security algorithm selection policy ID, where the security algorithm list, the security algorithm selection policy or the security algorithm selection policy ID is supported by the UE and stored in the application server may be preset according to a communication requirement.

Step 405: The network entity selects a security algorithm as a security protection algorithm for a service requested by the service request message from the security algorithm list that is supported by the network entity and corresponding to the security protection requirement, and the security algorithm list that is supported by the UE, stored in the application server and corresponding to the security protection requirement.

In the embodiment shown in FIG. 7, the UE sends to the network entity a security algorithm list that is supported by the UE and a security algorithm list stored in the application server, or one of the following: a security algorithm list, a security algorithm selection policy, and a security algorithm selection policy identifier which are corresponding to the security protection requirement in the former security algorithm list. When the network entity selects a security algorithm list, the security algorithm list stored in the application server is further considered, which further restricts security algorithms of different security protection requirements, and facilitates uniform management and update for selection of a security algorithm.

Figure 8:
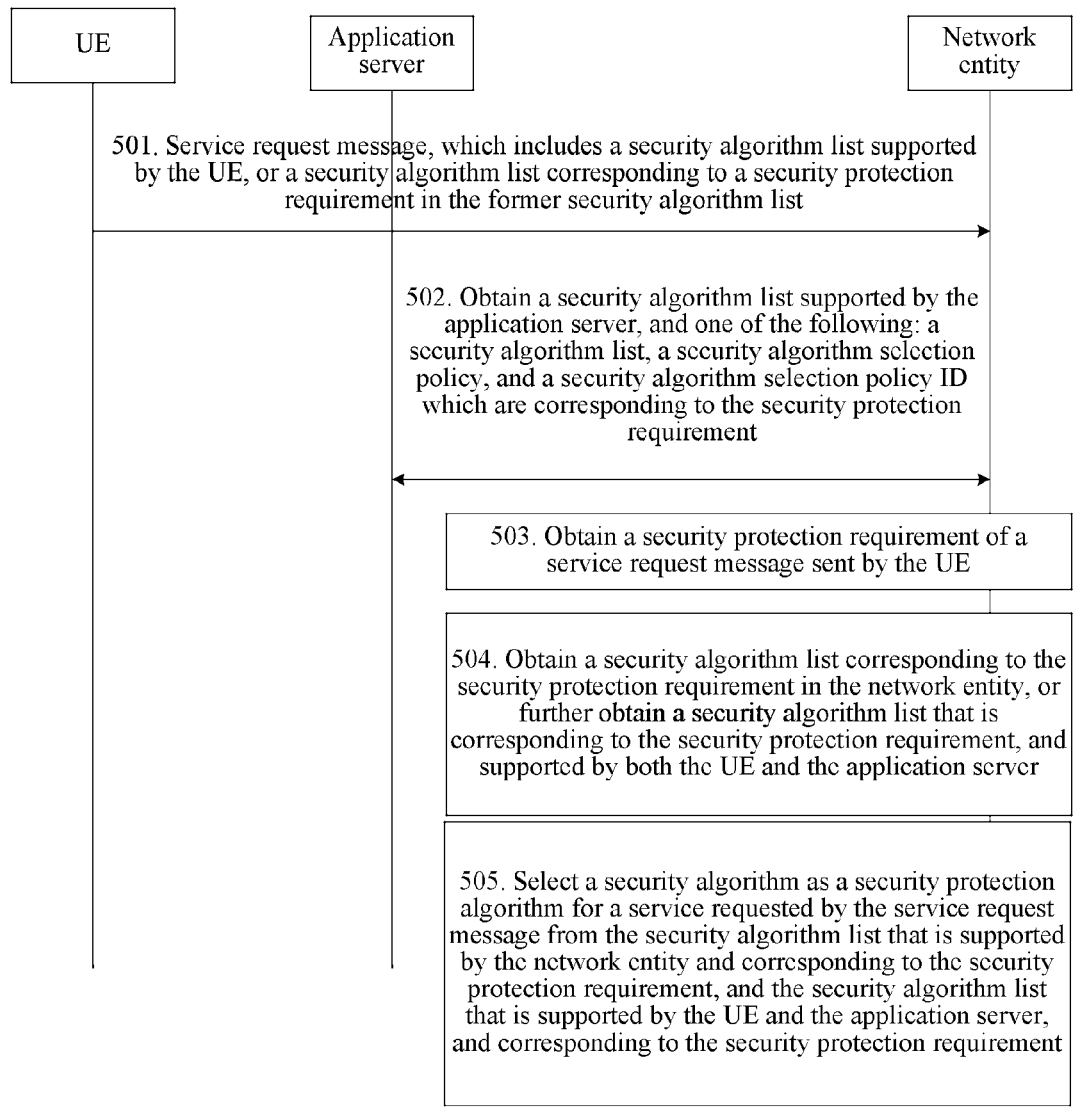
FIG. 8 is a flowchart of a method for security algorithm selection processing according to another embodiment of the present invention.

FIG. 8 is a flowchart of a method for security algorithm selection processing according to another embodiment of the present invention. The method includes the following steps:

Step 501: A UE sends a service request message to a network entity. The service request message includes a security algorithm list supported by the UE, or a security algorithm list that is corresponding to a security protection requirement and selected according to the security protection requirement of the service request message from the security algorithm list supported by the UE.

Specifically, whether the security algorithm list in the service request message is a security algorithm list that is supported by the UE and corresponding to the security protection requirement of the service request message, or is a security algorithm list supported by the UE, may be preset according to a communication requirement.

Step 502: After receiving the service request message sent by the UE, the network entity obtains a security algorithm list stored in an application server, and obtains a security algorithm list, a security algorithm selection policy, or a security algorithm selection policy ID, where the security algorithm list, the security algorithm selection policy, or the security algorithm selection policy ID is corresponding to the security protection requirement and stored in the application server.

Step 503: According to information about a preset mapping relationship between the service request message and the security protection requirement, the network entity obtains the security protection requirement of the service request message sent by the UE.

Step 504: If the network entity obtains a security algorithm list that is supported by both the UE and the application server and is corresponding to the security protection requirement of the service request message through step 501 and step 502, the network entity obtains a security algorithm list corresponding to the security protection requirement from the security algorithm list supported by the network entity.

Through step 501 and step 502, if the network entity obtains a security algorithm list supported by the UE, and one of the following: a security algorithm list, a security algorithm selection policy, and a security algorithm selection policy ID which are stored in the application server, the network entity in step 504 further selects a security algorithm list that is stored in the application server and supported by the UE, and a security algorithm list that is corresponding to the security protection requirement respectively.

If the service request message includes the security algorithm selection policy ID of the application server, the same mapping relationship between the security algorithm selection policy and the security algorithm selection policy ID needs to be preset in the network entity and the application server. The network entity obtains a corresponding security algorithm selection policy according to the security algorithm selection policy ID.

Step 505: The network entity selects a security algorithm as a security protection algorithm for a service requested by the service request message from the security algorithm list that is supported by the network entity and corresponding to the security protection requirement and the security algorithm list that is supported by the UE, stored in the application server and corresponding to the security protection requirement.

In the embodiment shown in FIG. 8, after receiving a service request message sent by the UE, the network entity obtains a security algorithm list stored in the application server, or one of the following: a security algorithm list, a security algorithm selection policy, and a security algorithm selection policy ID which are corresponding to a security protection requirement in the former security algorithm list, so that the UE does not need to obtain and send the security algorithm lists to the network entity, reducing network bandwidth occupied by the UE for sending the security algorithm list, or the security algorithm selection policy, or the security algorithm selection policy ID of the application server. In addition, when the network entity selects a security algorithm list, the security algorithm list stored in the application server is further considered, which further restricts security algorithms of different security protection requirements, and facilitates uniform management and update for selection of a security algorithm.

Through step 104 in FIG. 4, step 306 in FIG. 6, step 405 in FIG. 7, and step 505 in FIG. 8, after selecting a security algorithm, the network entity may send the selected security algorithm to the UE through a security mode command, so that the UE and the network entity perform security protection on a corresponding service through the selected security algorithm. Specifically, if the network entity is an eNB, the eNB may send the selected security algorithm to the UE directly; and if the network entity is an MME, the MME may send the selected security algorithm to the eNB, and the eNB forwards the security algorithm to the UE. A procedure for sending other messages by the network entity to the UE is the same as that in the preceding, which is not described here again.

Figure 9:
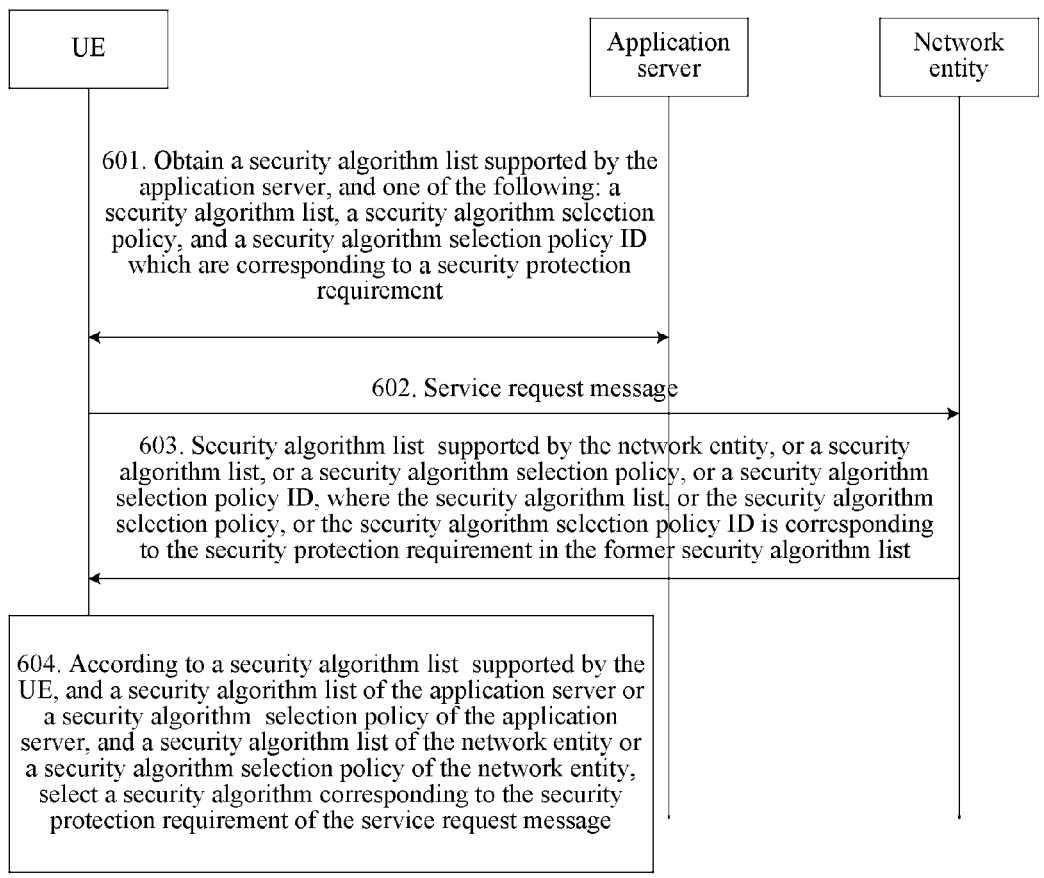
FIG. 9 is a flowchart of a method for security algorithm selection processing according to another embodiment of the present invention.

FIG. 9 is a flowchart of a method for security algorithm selection processing according to another embodiment of the present invention. The method includes the following steps:

Step 601: A UE sends an acquisition request message to an application server to obtain a security algorithm list stored in the application server, or a security algorithm list, or a security algorithm selection policy, or a security algorithm selection policy ID, where the security algorithm list, or the security algorithm selection policy, or the security algorithm selection policy ID is corresponding to a security protection requirement of a service request message to be sent in the former security algorithm list.

If the security algorithm selection policy ID is obtained from the application server, the UE needs to obtain a corresponding security algorithm selection policy according to a mapping relationship between the security algorithm selection policy and the security algorithm selection policy ID.

Step 602: The UE sends a service request message to a network entity.

In addition, step 602 may also be executed at the same time with or before step 601.

Step 603: After receiving the service request message sent by the UE, the network entity returns to the UE a security algorithm list supported by the network entity, or one of the following: a security algorithm list, a security algorithm selection policy, and a security algorithm selection policy ID which are corresponding to the security protection requirement in the former security algorithm list. The security algorithm selection policy is set based on the security algorithm list supported by the network entity.

If the security algorithm selection policy ID is returned by the network entity, the UE needs to obtain a corresponding security algorithm selection policy according to the mapping relationship between the security algorithm selection policy and the security algorithm selection policy ID.

Specifically, whether the network entity returns the security algorithm list supported by the network entity, or is one of the following: the security algorithm list, the security algorithm selection policy, and the security algorithm selection policy ID which are corresponding to the security protection requirement in the former security algorithm list, may be preset according to a communication requirement.

Step 604: The UE selects a security algorithm corresponding to the security protection requirement of the service request message according to the security algorithm list supported by the UE, and the security algorithm list stored in the application server or the security algorithm selection policy stored in the application server, and the security algorithm list of the network entity or the security algorithm selection policy of the network entity.

Specifically, in step 604, the UE may first select a security algorithm list that is supported by both the UE and the network entity, stored in the application server, and corresponding to the security protection requirement. This operation does not need to be executed if the network entity or the application server returns the security algorithm list that is supported by the network or the application server, and corresponding to the security protection requirement. Afterward, a common security algorithm among the three security algorithm list is selected. For specific implementation, reference may be made to a corresponding step in FIG. 4 to FIG. 8. In addition, if the network entity or the application server returns the security algorithm list, the security algorithm selection policy, or the security algorithm selection policy ID, where the security algorithm list, the security algorithm selection policy, or the security algorithm selection policy ID is supported by the network entity or the application server, the UE may also select a security algorithm list that is supported by both the UE and the network entity, and stored in the application server first, and then select a security algorithm corresponding to the security protection requirement from the selected list.

In the embodiment shown in FIG. 9, the UE obtains a security algorithm list supported by the network entity and a security algorithm list stored in the application server, or one of the following: a security algorithm list, a security algorithm selection policy, and a security algorithm selection policy ID which are corresponding to a security protection requirement in the security algorithm lists. According to this, a security algorithm list that is supported by the UE and the network entity, stored in the application server, and corresponding to the security protection requirement is selected, which involves few modifications to a procedure in the prior art. In addition, when the UE selects a security algorithm list, the security algorithm list stored in the application server is further considered, which further restricts security algorithms of different security protection requirements, and facilitates uniform management and update for selection of a security algorithm.

Figure 10:
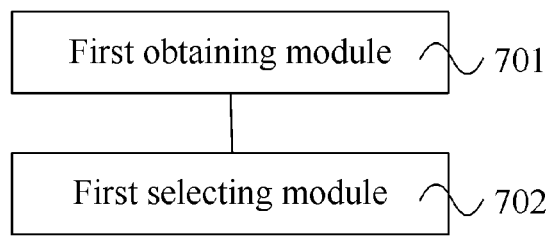
FIG. 10 is a schematic structural diagram of an apparatus for security algorithm selection processing according to an embodiment of the present invention.

FIG. 10 is a schematic structural diagram of an apparatus for security algorithm selection processing according to an embodiment of the present invention. The apparatus includes a first obtaining module 701 and a first selecting module 702. The first obtaining module 701 is configured to obtain a security protection requirement of a service request message sent by a UE; and the first selecting module 702 is configured to, according to the security protection requirement of the service request message, select a security algorithm from a security algorithm list supported by both the UE and a network entity. The security algorithm lists supported by the UE and/or the network entity are set separately based on different security protection requirements; or, the security algorithm lists supported by the UE and the network entity are used for indicating security capability of the UE and the network entity respectively.

Figure 11:
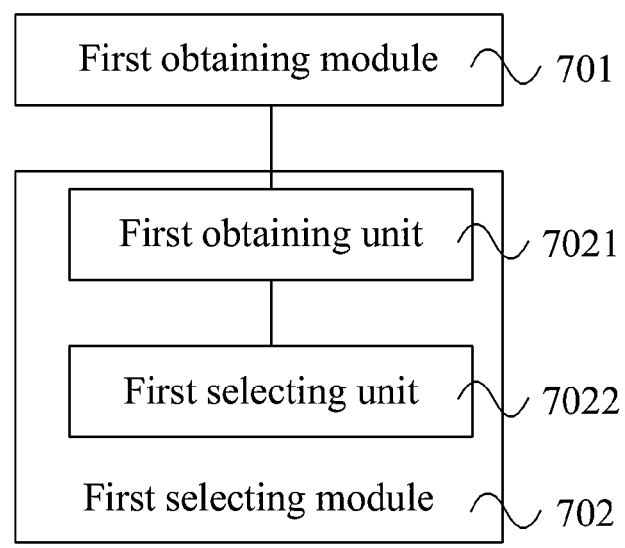
FIG. 11 is a schematic structural diagram of an apparatus for security algorithm selection processing according to another embodiment of the present invention.

FIG. 11 is a schematic structural diagram of an apparatus for security algorithm selection processing according to another embodiment of the present invention. Compared with the embodiment shown in FIG. 10, the first selecting module 702 in this embodiment includes a first obtaining unit 7021 and a first selecting unit 7022. The first obtaining unit 7021 is configured to obtain a security algorithm list supported by a UE, or a security algorithm list that is supported by the UE and corresponding to a security protection requirement of a service request message sent by the UE; and obtain a security algorithm list supported by a network entity, or a security algorithm list, or a security algorithm selection policy, or a security algorithm selection policy ID, where the security algorithm list, the security algorithm selection policy, or the security algorithm selection policy ID is corresponding to the security protection requirement of the service request message in the former security algorithm list. The security algorithm selection policy is set based on the security algorithm list that is supported by the network entity. The first selecting unit 7022 is configured to select a security algorithm corresponding to the security protection requirement according to the security algorithm list obtained by the first obtaining unit 7021 from the UE, and one of the following: the security algorithm list, the security algorithm selection policy, and the security algorithm selection policy ID which are obtained by the first obtaining unit 7021 from the network entity.

Furthermore, in the embodiment shown in FIG. 11, the first obtaining unit 7021 may further obtain a security algorithm list stored in an application server, and one of the following: a security algorithm list, a security algorithm selection policy, and a security algorithm selection policy ID which are corresponding to the security protection requirement of the service request message in the former security algorithm list. The security algorithm selection policy is set based on the security protection requirement, and the security algorithm list stored in the application server is set separately based on different security protection requirements. Accordingly, the first selecting unit 7022 is configured to, according to the security algorithm list obtained by the first obtaining unit 7021 from the UE, and one of the following: the security algorithm list, the security algorithm selection policy, and the security algorithm selection policy ID which are obtained from the network entity and the application server respectively, select a security algorithm that is supported by the UE, network entity and application server, and corresponding to the security protection requirement.

The security algorithm list of the UE, network entity and/or application server is set separately based on different security protection requirements. Therefore, the apparatus for security algorithm selection processing in this embodiment of the present invention may select different security algorithms according to security protection requirements of different service request messages, so as to perform different security protection for the corresponding service between the UE and the network entity, which improves security of the service. Moreover, in a communication system, complexity of each algorithm and an overhead occupied by each algorithm may further be considered comprehensively, and therefore, performance of the communication system is improved when effective security protection is performed on the service.

The apparatus for security algorithm selection processing provided in the preceding embodiments of the present invention may be used to implement a corresponding procedure of selecting each security algorithm in the preceding embodiments.

A communication system provided in an embodiment of the present invention includes a network entity 1 and an apparatus for security algorithm selection processing 2. The apparatus for security algorithm selection processing 2 is configured to: obtain a security protection requirement of a service request message sent by a UE, and according to the security protection requirement of the service request message, select a security algorithm from a security algorithm list supported by both the UE and the network entity 1. The security algorithm list supported by the UE and/or the network entity 1 is set separately based on different security protection requirements, or, the security algorithm lists supported by the UE and the network entity 1 are used for indicating security capability of the UE and the network entity 1 respectively. The apparatus for security algorithm selection processing 2 in this embodiment may be implemented based on the apparatus for security algorithm selection processing shown in FIG. 10 or FIG. 11.

Furthermore, the communication system may further include an application server 3, which is configured to: store a security algorithm list, a security algorithm selection policy, or a security algorithm selection policy identifier, where the security algorithm list, the security algorithm selection policy, or the security algorithm selection policy identifier is stored in the application server 3. The security algorithm selection policy is set based on the security protection requirement, and the security algorithm list stored in the application server 3 is set separately based on different security protection requirements. Accordingly, the apparatus for security algorithm selection processing 2 may further obtain the security algorithm list, the security algorithm selection policy, or the security algorithm selection policy ID, where the security algorithm list, the security algorithm selection policy, or the security algorithm selection policy ID is stored in the application server 3; and according to a security algorithm list obtained from the UE, and one of the following: a security algorithm list, a security algorithm selection policy, and a security algorithm selection policy ID which are obtained from the network entity 1 and the application server 3 respectively, select a security algorithm corresponding to the security protection requirement of the service request message sent by the UE. The security algorithm selection policy of the network entity 1 is set based on the security algorithm list supported by the network entity 1. The apparatus for security algorithm selection processing 2 in this embodiment may be implemented based on the apparatus for security algorithm selection processing shown in FIG. 11.

Figure 12:
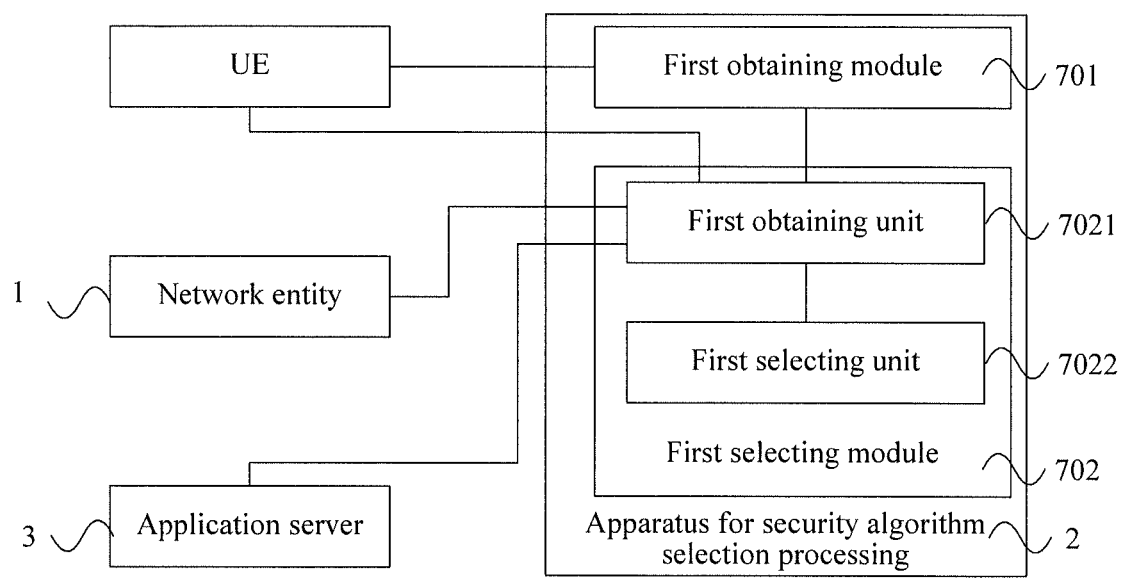
FIG. 12 is a schematic structural diagram of a communication system according to an embodiment of the present invention.

FIG. 12 is a schematic structural diagram of a communication system according to an embodiment of the present invention. An apparatus for security algorithm selection processing 2 in this embodiment adopts the apparatus for security algorithm selection processing shown in FIG. 11.

Figure 13:
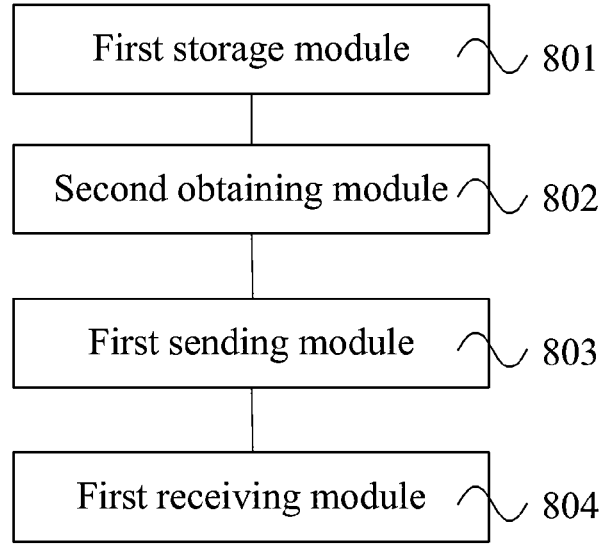
FIG. 13 is a schematic structural diagram of a UE according to an embodiment of the present invention.

FIG. 13 is a schematic structural diagram of a UE according to an embodiment of the present invention. The UE in this embodiment may implement corresponding procedures shown in FIG. 4 and FIG. 8 of the present invention, and includes a first storage module 801, a second obtaining module 802, a first sending module 803, and a first receiving module 804. The first storage module 801 is configured to store a security algorithm list supported by the UE, where the security algorithm list is set separately based on different security protection requirements, or is used for indicating security capability of the UE. The second obtaining module 802 is configured to obtain a security algorithm list from the first storage module 801, or query a security protection requirement of a service request message and obtain a security algorithm list corresponding to the security protection requirement from the first storage module 801. The first sending module 803 is configured to generate and send a service request message to a network entity, where the service request message includes the security algorithm list obtained by the second obtaining module 802. The first receiving module 804 is configured to, according to the service request message, receive a security algorithm returned by the network entity, where the security algorithm is selected, according to the security protection requirement of the service request message, from a security algorithm list supported by both the UE and the network entity.

Figure 14:
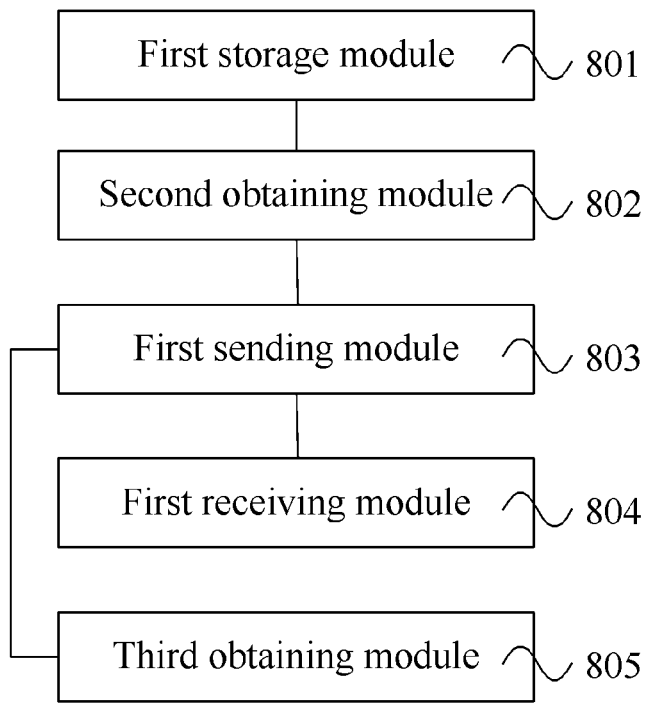
FIG. 14 is a schematic structural diagram of a UE according to another embodiment of the present invention.

FIG. 14 is a schematic structural diagram of a UE according to another embodiment of the present invention. The UE in this embodiment may implement a corresponding procedure in the embodiment shown in FIG. 7 of the present invention. Compared with the embodiment shown in FIG. 13, the UE in this embodiment further includes a third obtaining module 805, which is configured to obtain a security algorithm list stored in an application server, or one of the following: a security algorithm list, a security algorithm selection policy, and a security algorithm selection policy ID which are corresponding to the security protection requirement in the former security algorithm list, where the security algorithm selection policy is set based on the security protection requirement, and the security algorithm list stored in the application server is set separately based on different security protection requirements. Accordingly, the service request message sent by the first sending module 803 to the network entity includes the security algorithm list obtained by the second obtaining module 802 from the first storage module 801, and one of the following: the security algorithm list, the security algorithm selection policy, and the security algorithm selection policy ID which are obtained by the third obtaining module 805 from the application server.

Figure 15:
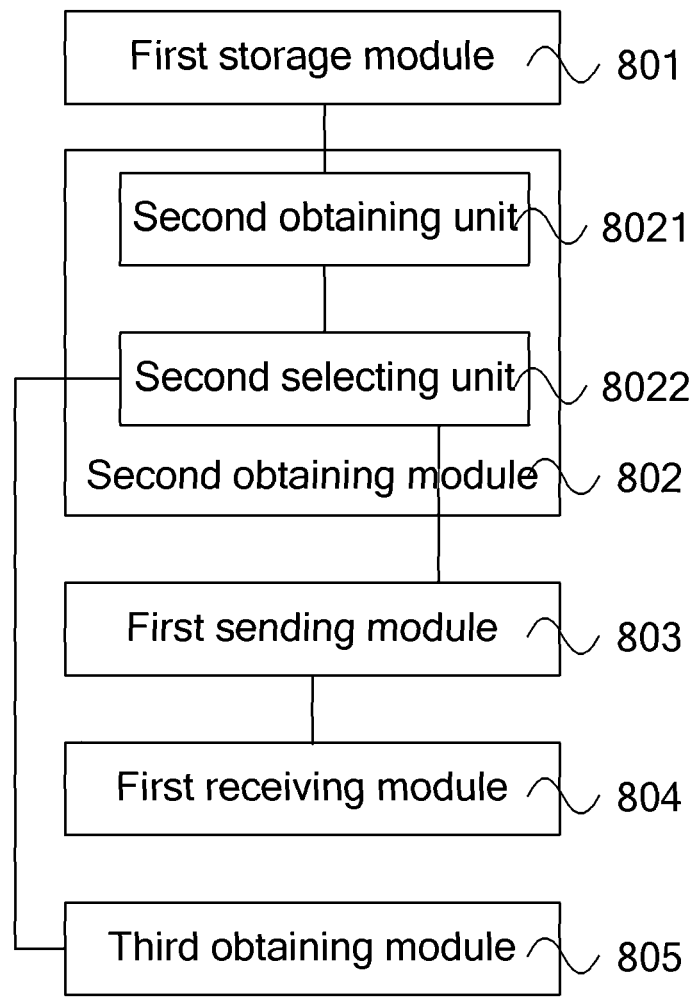
FIG. 15 is a schematic structural diagram of a UE according to another embodiment of the present invention.

FIG. 15 is a schematic structural diagram of a UE according to another embodiment of the present invention. The UE in this embodiment may implement a corresponding procedure in the embodiment shown in FIG. 6 of the present invention. Compared with the embodiment shown in FIG. 13, the UE in this embodiment further includes a third obtaining module 805, which is configured to obtain a security algorithm list stored in an application server, or a security algorithm list corresponding to a security protection requirement of a service request message sent by the UE in the former security algorithm list, or a security algorithm selection policy or a security algorithm selection policy ID, where the security algorithm selection policy is set based on the security protection requirement. Accordingly, the second obtaining module 802 includes a second obtaining unit 8021 and a second selecting unit 8022. The second obtaining unit 8021 is configured to obtain a security algorithm list from a first storage module 801, or query the security protection requirement of the service request message and obtain a security algorithm list corresponding to the security protection requirement from the first storage module 801. The second selecting unit 8022 is configured to, according to the security algorithm list obtained by the second obtaining unit 8021 from the first storage module 801, and one of the following: the security algorithm list, the security algorithm selection policy, and the security algorithm selection policy ID which are obtained by the third obtaining module 805 from the application server, select a security algorithm list that is stored in the application server and supported by the UE, or a security algorithm list that is corresponding to the security protection requirement of the service request message sent by the UE, stored in the application server and supported by the UE. Accordingly, the security algorithm list in the service request message sent by the UE to the network entity specifically is the security algorithm list selected by the second selecting unit 8022.

Figure 16:
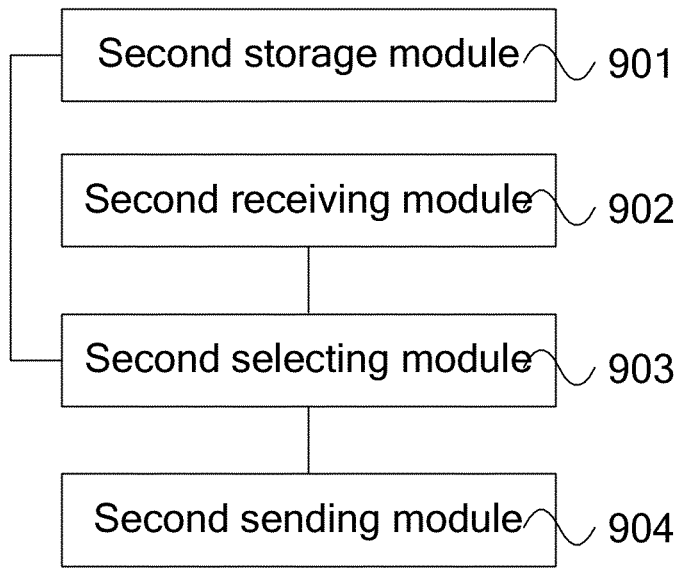
FIG. 16 is a schematic structural diagram of a network entity according to an embodiment of the present invention.

FIG. 16 is a schematic structural diagram of a network entity according to an embodiment of the present invention. The network entity in this embodiment may implement a corresponding procedure shown in FIG. 4 of the present invention, and includes a second storage module 901, a second receiving module 902, a second selecting module 903, and a second sending module 904. The second storage module 901 is configured to store a security algorithm list or a security algorithm selection policy, where the security algorithm list or the security algorithm selection policy is supported by the network entity. The security algorithm list is set separately based on different security protection requirements, or is used for indicating security capability of the network entity; and the security algorithm selection policy is set based on the security algorithm list that is supported by the network entity. The second receiving module 902 is configured to receive a service request message sent by a UE, where the service request message includes a security algorithm list supported by the UE. The second selecting module 903 is configured to, according to the security algorithm list or the security algorithm selection policy, where the security algorithm list or the security algorithm selection policy is stored in the second storage module 901, and the security algorithm list in the service request message received by the second receiving module 902, select a security algorithm corresponding to a security protection requirement from a security algorithm list supported by both the UE and the network entity. The second sending module 904 is configured to send the security algorithm selected by the second selecting module 903 to the UE.

Corresponding to a procedure shown in FIG. 7, in the network entity in the embodiment shown in FIG. 16, the security algorithm list in the service request message received by the second receiving module 902 may specifically be a security algorithm list that is supported by the UE and stored in an application server, or a security algorithm list that is supported by the UE, stored in the application server, and corresponding to the security protection requirement of the service request message. Accordingly, the second selecting module 903 is configured to select a security algorithm corresponding to the security protection requirement from the security algorithm list or the security algorithm selection policy, where the security algorithm list or the security algorithm selection policy is stored in the second storage module 901, and the security algorithm list in the service request message.

Corresponding to a procedure in the embodiment shown in FIG. 6, in the network entity in the embodiment shown in FIG. 16, the service request message received by the second receiving module 902 may further include a security algorithm list stored in the application server, or one of the following: a security algorithm list, a security algorithm selection policy, and a security algorithm selection policy ID which are corresponding to the security protection requirement of the service request message in the former security algorithm list, where the security algorithm selection policy is set based on the security protection requirement, and the security algorithm list stored in the application server is set separately based on different security protection requirements. Accordingly, the second selecting module 903 is configured to select a security algorithm corresponding to the security protection requirement according to the security algorithm list or the security algorithm selection policy, where the security algorithm list or the security algorithm selection policy is stored in the second storage module 901, and the security algorithm list of the UE in the service request message, and the security algorithm list stored in the application server, and one of the following: the security algorithm list, the security algorithm selection policy, and the security algorithm selection policy ID which are corresponding to the security protection requirement.

Figure 17:
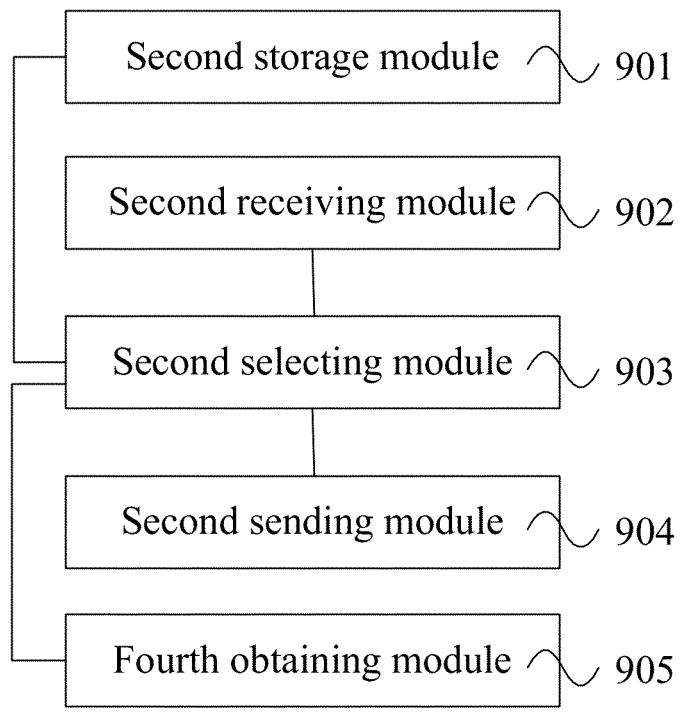
FIG. 17 is a schematic structural diagram of a network entity according to another embodiment of the present invention.

FIG. 17 is a schematic structural diagram of a network entity according to another embodiment of the present invention. Corresponding to a procedure in the embodiment shown in FIG. 8, compared with the network entity in the embodiment shown in FIG. 16, a security algorithm list in a service request message received by a second receiving module 902 may specifically be a security algorithm list that is supported by a UE and corresponding to a security protection requirement of the service request message sent by the UE. Accordingly, the network entity further includes a fourth obtaining module 905, which is configured to obtain a security algorithm list stored in an application server, or a security algorithm list corresponding to the security protection requirement in the former security algorithm list, or a security algorithm selection policy, or a security algorithm selection policy ID, where the security algorithm selection policy is set based on the security protection requirement, and the security algorithm list stored in the application server is set separately based on different security protection requirements. Accordingly, the second selecting module 903 selects a security algorithm corresponding to the security protection requirement according to a security algorithm list or a security algorithm selection policy, where the security algorithm list or the security algorithm selection policy is stored in a second storage module 901, and the security algorithm list in the service request message received by the second receiving module 902, and the security algorithm list stored in the application server, the security algorithm list corresponding to the security protection requirement, the security algorithm selection policy, or the security algorithm selection policy ID, where the security algorithm list stored in the application server, the security algorithm list corresponding to the security protection requirement, the security algorithm selection policy, or the security algorithm selection policy ID is obtained by the fourth obtaining module 905.

Figure 18:
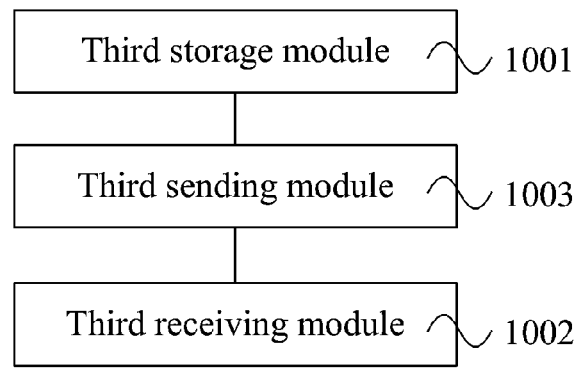
FIG. 18 is a schematic structural diagram of an application server according to an embodiment of the present invention.

FIG. 18 is a schematic structural diagram of an application server according to an embodiment of the present invention. The application server in this embodiment includes a third storage module 1001, a third receiving module 1002, and a third sending module 1003. The third storage module 1001 is configured to store a security algorithm list of the application server, a security algorithm selection policy of the application server, or a security algorithm selection policy ID of the application server, where the security algorithm selection policy is set based on a security protection requirement. The third receiving module 1002 is configured to receive an acquisition request message sent by a UE or a network entity. The third sending module 1003 is configured to return to the corresponding UE which sends the acquisition request message: the security algorithm list, the security algorithm selection policy, or the security algorithm selection policy ID, where the security algorithm list, the security algorithm selection policy, or the security algorithm selection policy ID is stored in the third storage module 1001.

A communication system provided in another embodiment of the present invention includes a network entity 1. In the communication system in this embodiment, a UE stores a security algorithm list supported by the UE, where the security algorithm list is set separately based on different security protection requirements. The network entity 1 stores a security algorithm list or a security algorithm selection policy, where the security algorithm list or the security algorithm selection policy is supported by the network entity 1. The security algorithm list is set separately based on different security protection requirements, and the security algorithm selection policy is set based on the security algorithm list that is supported by the network entity 1. The UE generates and sends a service request message to the network entity 1. The service request message includes a security algorithm list supported by the UE or a security algorithm list corresponding to a security protection requirement of the service request message in the former security algorithm list; and receives a security algorithm returned by the network entity 1, where the security algorithm is obtained through selection by the network entity 1, according to the security protection requirement of the service request message, from a security algorithm list supported by both the UE and the network entity 1. The network entity 1 receives the service request message sent by the UE; according to the security algorithm list or the security algorithm selection policy, where the security algorithm list or the security algorithm selection policy is supported by the network entity 1, and the security algorithm list carried in the service request message, selects a security algorithm corresponding to the security protection requirement of the service request message sent by the UE from the security algorithm list supported by both the UE and the network entity 1; and sends the selected security algorithm to the UE. The communication system in this embodiment may implement a procedure in the embodiment shown in FIG. 4 of the present invention, the UE may adopt the UE in the embodiment shown in FIG. 13, and the network entity 1 may adopt the network entity in the embodiment shown in FIG. 16.

Figure 19:
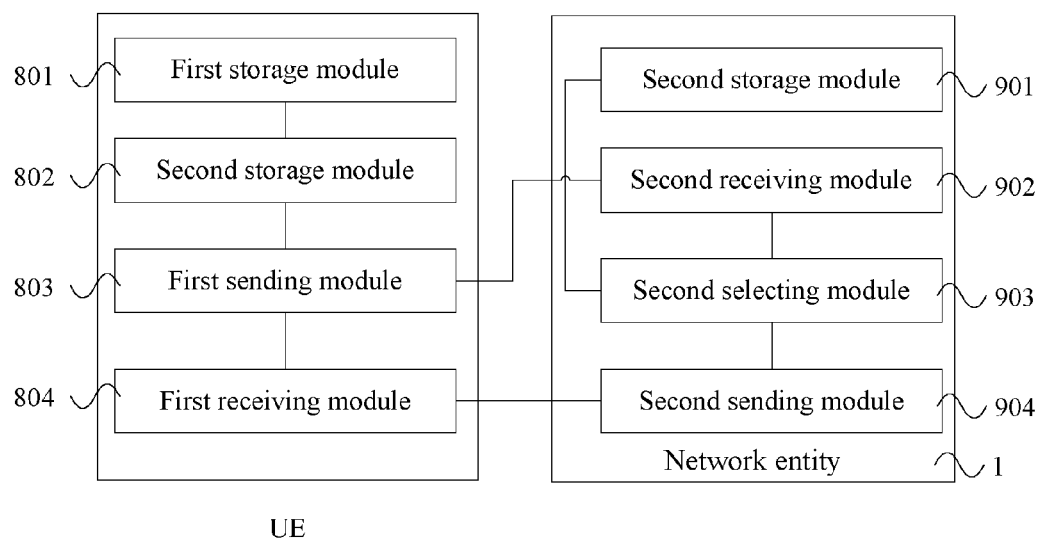
FIG. 19 is a schematic structural diagram of a communication system according to another embodiment of the present invention.

FIG. 19 is a schematic structural diagram of a communication system according to another embodiment of the present invention.

Figure 20:
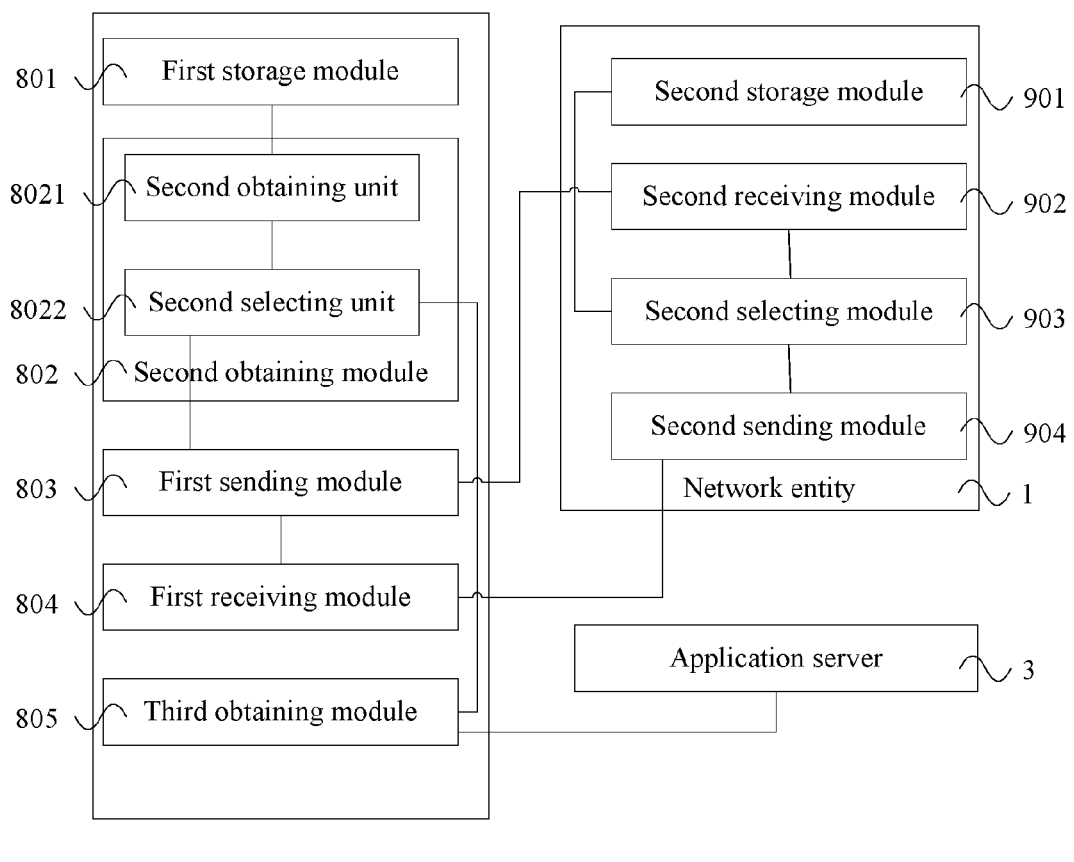
FIG. 20 is a schematic structural diagram of a communication system according to another embodiment of the present invention.

Furthermore, the communication system in this embodiment may further include an application server 3, which is configured to: store a security algorithm list of the application server 3, a security algorithm selection policy of the application server 3, or a security algorithm selection policy ID of the application server 3, where the security algorithm selection policy is set based on a security protection requirement, and the security algorithm list stored in the application server 3 is set separately based on different security protection requirements; and according to an acquisition request message sent by the UE, return to the UE: the security algorithm list, the security algorithm selection policy, or the security algorithm selection policy identifier, where the security algorithm list, the security algorithm selection policy, or the security algorithm selection policy identifier is stored in the application server 3. Accordingly, the UE may further be configured to obtain a security algorithm list stored in the application server 3, or one of the following: a security algorithm list, a security algorithm selection policy, and a security algorithm selection policy ID which are corresponding to the security protection requirement in the former security algorithm list, and send the security algorithm list stored in the application server 3, or one of the following: the security algorithm list, the security algorithm selection policy, and the security algorithm selection policy ID which are corresponding to the security protection requirement in the former security algorithm list to the network entity 1 through a service request message; or, select a security algorithm list that is stored in the application server 3 and supported by the UE, or a security algorithm list corresponding to the security protection requirement in the former security algorithm list, and send the security algorithm list that is stored in the application server 3 and supported by the UE, or the security algorithm list corresponding to the security protection requirement in the former security algorithm list to the network entity 1 through a service request message. According to the security algorithm list or the security algorithm selection policy, where the security algorithm list or the security algorithm selection policy is supported by the network entity 1, and the security algorithm list carried in the service request message, the network entity 1 selects a security algorithm that is corresponding to the security protection requirement, stored in the application server 3, and supported by both the UE and the network entity 1. The communication system in this embodiment may be configured to implement procedures in the embodiments shown in FIG. 6 and FIG. 7 of the present invention, the UE may adopt the UE in the embodiments shown in FIG. 15 and FIG. 14, and the network entity 1 may adopt the corresponding network entity in the embodiment shown in FIG. 16. FIG. 20 is a schematic structural diagram of a communication system according to another embodiment of the present invention.

Figure 21:
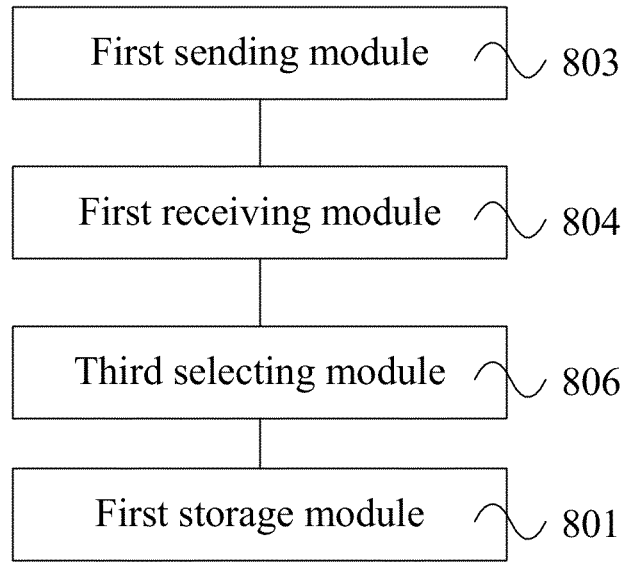
FIG. 21 is a schematic structural diagram of a UE according to another embodiment of the present invention.

FIG. 21 is a schematic structural diagram of a UE according to another embodiment of the present invention. The UE in this embodiment may implement corresponding procedures in the embodiments shown in FIG. 5 and FIG. 8 of the present invention, and includes a first storage module 801, a first sending module 803, a first receiving module 804, and a third selecting module 806. The first storage module 801 is configured to store a security algorithm list supported by the UE, where the security algorithm list is set separately based on different security protection requirements, or is used for indicating security capability of the UE. The first sending module 803 is configured to generate and send a service request message to a network entity. The first receiving module 804 is configured to receive a security algorithm list, a security algorithm selection policy, or a security algorithm selection policy ID, where the security algorithm list, the security algorithm selection policy, or the security algorithm selection policy ID is returned by the network entity. The security algorithm list is a security algorithm list supported by the network entity, or a security algorithm list corresponding to a security protection requirement of the service request message sent by the UE in the former security algorithm list, and the security algorithm selection policy is set based on the security algorithm list supported by the network entity. The third selecting module 806 is configured to, according to the security algorithm list stored in the first storage module 801, and the security algorithm list received by the first receiving module 804, select a security algorithm corresponding to the security protection requirement from a security algorithm list supported by both the UE and the network entity.

Figure 22:
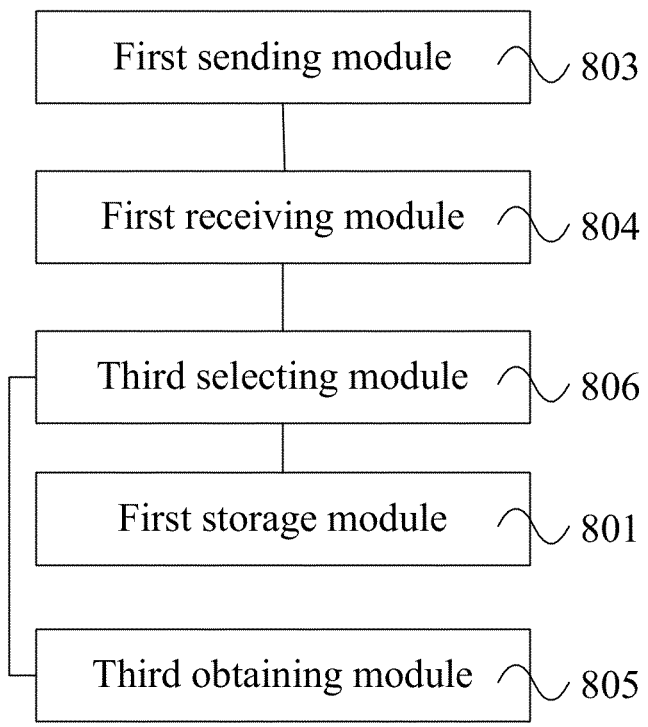
FIG. 22 is a schematic structural diagram of a UE according to another embodiment of the present invention.

FIG. 22 is a schematic structural diagram of a UE according to another embodiment of the present invention. The UE in this embodiment may implement a corresponding procedure in the embodiment shown in FIG. 9 of the present invention. Compared with the embodiment shown in FIG. 21, the UE in this embodiment further includes a third obtaining module 805, which is configured to obtain a security algorithm list stored in an application server, or one of the following: a security algorithm list, a security algorithm selection policy, and a security algorithm selection policy ID which are corresponding to a security protection requirement of a service request message sent by the UE in the former security algorithm list, where the security algorithm selection policy is set based on the security protection requirement. Accordingly, the third selecting module 806 is configured to, according to the security algorithm list stored in the first storage module 801, and one of the following: the security algorithm list, the security algorithm selection policy, and the security algorithm selection policy ID which are obtained by the third obtaining module 805 from the application server, and one of the following: the security algorithm list, the security algorithm selection policy, and the security algorithm selection policy ID which are received by the first receiving module 804 from the network entity, select a security algorithm that is corresponding to the security protection requirement of the service request message sent by the UE, stored in the application server, and supported by both the UE and the network entity.

Figure 23:
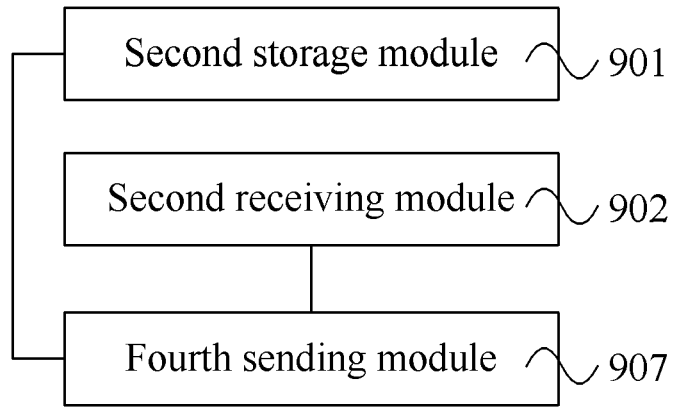
FIG. 23 is a schematic structural diagram of a network entity according to another embodiment of the present invention.

FIG. 23 is a schematic structural diagram of a network entity according to another embodiment of the present invention. The network entity in this embodiment may implement a corresponding procedure in the embodiment shown in FIG. 5 of the present invention. The network entity in this embodiment includes a second storage module 901, a second receiving module 902, and a fourth sending module 907. The second storage module 901 is configured to store a security algorithm list, a security algorithm selection policy, or a security algorithm selection policy ID, where the security algorithm list, the security algorithm selection policy, or the security algorithm selection policy ID is supported by the network entity. The security algorithm list is set separately based on different security protection requirements, or is used for indicating security capability of the network entity, and the security algorithm selection policy is set based on the security algorithm list supported by the network entity. The second receiving module 902 is configured to receive a service request message sent by a UE. The fourth sending module 907 is configured to send to the UE: the security algorithm list stored in the second storage module 901, and one of the following: the security algorithm list, the security algorithm selection policy, and the security algorithm selection policy ID which are corresponding to a security protection requirement of the service request message in the former security algorithm list.

Figure 24:
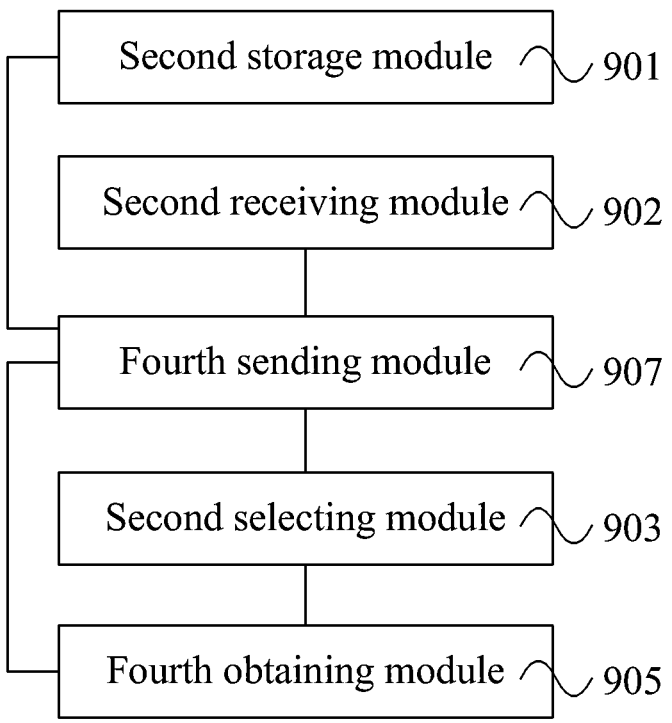
FIG. 24 is a schematic structural diagram of a network entity according to another embodiment of the present invention.

FIG. 24 is a schematic structural diagram of a network entity according to another embodiment of the present invention. The network entity in this embodiment may implement a corresponding procedure in the embodiment shown in FIG. 9 of the present invention. Compared with the embodiment shown in FIG. 23, the network entity in this embodiment further includes a fourth obtaining unit 905 and a second selecting module 903. The fourth obtaining module 905 is configured to obtain a security algorithm list stored in an application server, and one of the following: a security algorithm list, a security algorithm selection policy, and a security algorithm selection policy ID which are corresponding to a security protection requirement in the former security protection requirement. The security algorithm selection policy is set based on the security protection requirement, and the security algorithm list stored in the application server is set separately based on different security protection requirements. The second selecting module 903 is configured to select a security algorithm list that is stored in the application server and supported by the network entity, and one of the following: a security algorithm list, a security algorithm selection policy, and a security algorithm selection policy ID which are corresponding to the security protection requirement, according to the security algorithm list or the security algorithm selection policy, where the security algorithm list or the security algorithm selection policy is stored in the second storage module 901, and the security algorithm list that is stored in the application server and obtained by the fourth obtaining module 905, and one of the following: the security algorithm list, the security algorithm selection policy, and the security algorithm selection policy ID which are corresponding to the security protection requirement and obtained by the fourth obtaining module 905. The fourth sending module 907 is configured to: send to the UE: the security algorithm list or the security algorithm selection policy, where the security algorithm list or the security algorithm selection policy is stored in the second storage module 901, and the security algorithm list that is stored in the application server and obtained by the fourth obtaining module 905, and one of the following: the security algorithm list, the security algorithm selection policy, and the security algorithm selection policy ID which are corresponding to the security protection requirement and obtained by the fourth obtaining module 905; or send to the UE: the security algorithm list selected by the second selecting module 903, and one of the following: the security algorithm list, the security algorithm selection policy, and the security algorithm selection policy ID which are corresponding to the security protection requirement and selected by the second selecting module 903.

Figure 25:
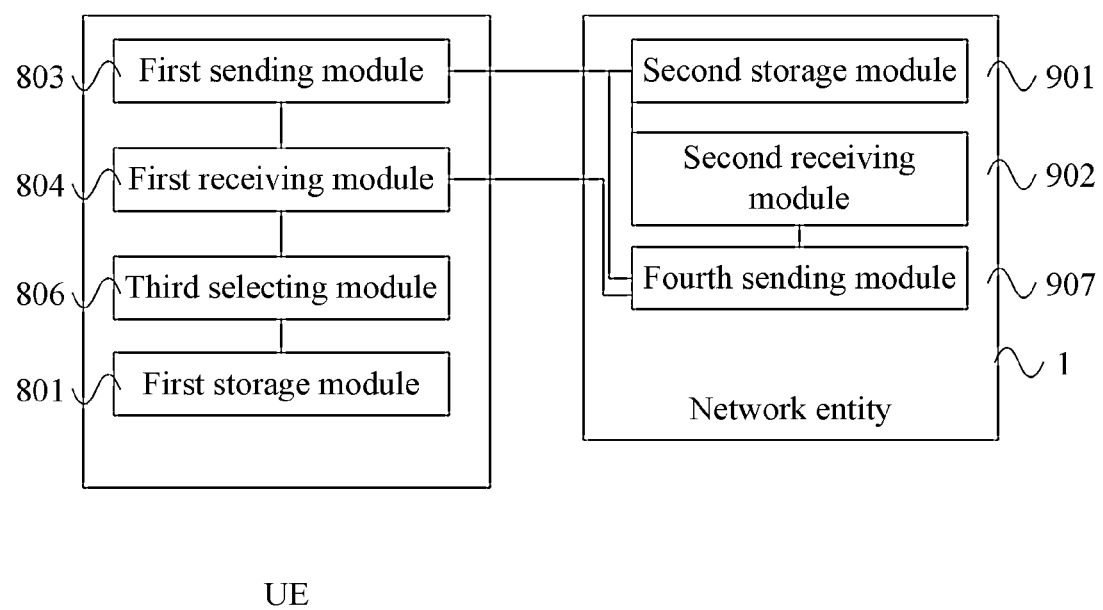
FIG. 25 is a schematic structural diagram of a communication system according to another embodiment of the present invention.

In a communication system provided in another embodiment of the present invention, a UE stores a security algorithm list supported by the UE, where the security algorithm list is set separately based on different security protection requirements. A network entity 1 stores a security algorithm list, a security algorithm selection policy, or a security algorithm selection policy ID, where the security algorithm list, the security algorithm selection policy, or the security algorithm selection policy ID is supported by the network entity 1. The security algorithm list is set separately based on different security protection requirements, or correspondingly indicates security capability of the UE or the network entity 1; and the security algorithm selection policy is set based on the security algorithm list supported by the network entity 1. The UE generates and sends a service request message to the network entity 1, and receives a security algorithm list, a security algorithm selection policy, or a security algorithm selection policy ID, where the security algorithm list, the security algorithm selection policy, or the security algorithm selection policy ID is returned by the network entity 1. The security algorithm list is a security algorithm list supported by the network entity 1, or a security algorithm list corresponding to a security protection requirement of the service request message in the former security algorithm list. Furthermore, according to the security algorithm list stored in the UE, and one of the following: the security algorithm list, the security algorithm selection policy, and the security algorithm selection policy ID which are returned by the network entity 1, a security algorithm corresponding to the security protection requirement of the service request message sent by the UE is selected. The network entity 1 is configured to: receive the service request message sent by the UE, and send to the UE: the security algorithm list stored in the network entity 1, and one of the following: the security algorithm list, the security algorithm selection policy, and the security algorithm selection policy ID which are corresponding to the security protection requirement of the service request message in the former security algorithm list. The communication system in this embodiment may be configured to implement a procedure in the embodiment shown in FIG. 5 of the present invention, the UE may adopt the UE in the embodiment shown in FIG. 21, and the network entity 1 may adopt the corresponding network entity in the embodiment shown in FIG. 23. FIG. 25 is a schematic structural diagram of a communication system according to another embodiment of the present invention.

Figure 26:
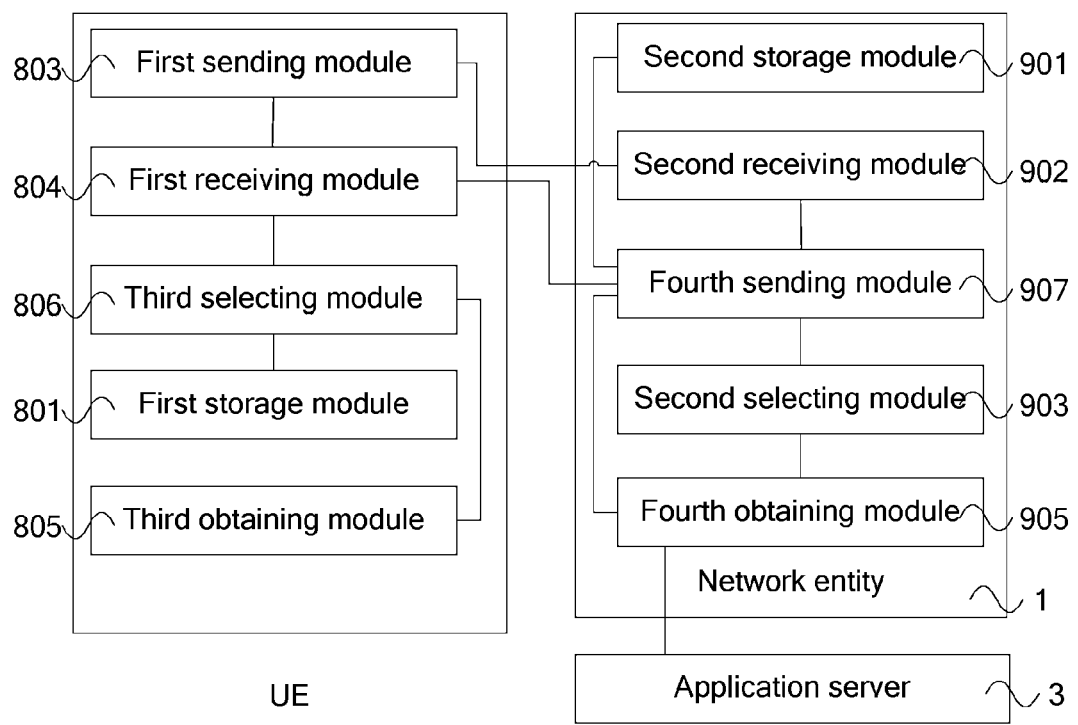
FIG. 26 is a schematic structural diagram of a communication system according to another embodiment of the present invention.

Furthermore, the preceding communication system may further include an application server 3, which is configured to: store a security algorithm list of an application server 3, a security algorithm selection policy of the application server 3, or a security algorithm selection policy ID of the application server, where the security algorithm selection policy is set based on a security protection requirement; and according to an acquisition request message sent by the UE, return to a UE: the security algorithm list stored in the application server 3, and one of the following: a security algorithm list, a security algorithm selection policy, and a security algorithm selection policy ID which are corresponding to the security protection requirement of the service request message sent by the UE. Accordingly, A network entity 1 is further configured to obtain, through an acquisition request message, a security algorithm list stored in the application server 3, or a security algorithm list, a security algorithm selection policy, or a security algorithm selection policy ID, where the security algorithm list, the security algorithm selection policy, or the security algorithm selection policy ID is corresponding to the security protection requirement in the former security algorithm list, and send to the UE: the security algorithm list stored in the application server 3, or the security algorithm list, the security algorithm selection policy, or the security algorithm selection policy ID, where the security algorithm list, the security algorithm selection policy, or the security algorithm selection policy ID is corresponding to the security protection requirement in the former security algorithm list; or, select a security algorithm list that is stored in the application server 3 and supported by the network entity 1, and one of the following: a security algorithm list, a security algorithm selection policy, and a security algorithm selection policy ID which are corresponding to the security protection requirement, and send to the UE: the security algorithm list that is stored in the application server 3 and supported by the network entity 1, and one of the following: the security algorithm list, the security algorithm selection policy, and the security algorithm selection policy ID which are corresponding to the security protection requirement. According to the security algorithm list stored in the UE, and one of the following: the security algorithm list, the security algorithm selection policy, and the security algorithm selection policy ID which are returned by the network entity 1, the UE selects a security algorithm that is corresponding to the security protection requirement of the service request message, stored in the application server 3, and supported by both the UE and the network entity 1. The communication system in this embodiment may be configured to implement a procedure in the embodiment shown in FIG. 9 of the present invention, the UE may adopt the UE in the embodiment shown in FIG. 22, and the network entity 1 may adopt the corresponding network entity in the embodiment shown in FIG. 24. FIG. 26 is a schematic structural diagram of a communication system according to another embodiment of the present invention.

Persons of ordinary skill in the art may understand that all or a part of the steps of the preceding method embodiments may be implemented by a program instructing relevant hardware. The program may be stored in a computer readable storage medium. When the program runs, steps of the preceding method embodiments are executed. The storage medium includes any medium capable of storing program codes, such as an ROM, an RAM, a magnetic disk, or an optical disk.

In the embodiments of the present invention, different security algorithms may be selected according to security protection requirements of different service request messages, so that different security protection is performed on the corresponding service, which improves security of the service. Moreover, in a communication system, complexity of each algorithm and an overhead occupied by each algorithm may further be considered comprehensively, and therefore, performance of the communication system is improved when effective security protection is performed on the service.

Finally, it should be noted that the preceding embodiments are merely used for describing the technical solutions of the present invention, but shall not be construed as a limitation to the present invention. Although the present invention has been described in detail with reference to the preceding exemplary embodiments, persons skilled in the art may still make modifications or equivalent replacements to the technical solutions of the present invention without departing from the spirit and scope of the technical solutions of the present invention.

What is claimed is:

1. A method for security algorithm selection processing, comprising:
   receiving a service request message sent by a user equipment; and
   selecting, according to a security protection requirement of a service requested by the service request message, a security algorithm from a security algorithm list determined based on security algorithms supported by both the user equipment and a network entity for the service requested by the service request message, as a determined security algorithm list supported by both the user equipment and the network entity,
   wherein the security algorithm list supported by both the user equipment and the network entity is determinable based on security algorithms settable in a security algorithm list for the user equipment based on mappings between a security protection requirement and a service requested by a service request message and/or based on security algorithms settable in a security algorithm list for the network entity based on mappings between a security protection requirement and a service requested by a service request message.

2. The method according to claim 1, wherein:
   a security algorithm list supported by the user equipment and a security algorithm list supported by the network entity are used for indicating respective security capabilities of the user equipment and the network entity; or
   the network entity pre-stores a security algorithm list supported by the user equipment, or the service request message includes the security algorithm list supported by the user equipment, and the selecting of the security algorithm from the determinable security algorithm list supported by both the user equipment and the network entity comprises: selecting, by the network entity, from the pre-stored security algorithm list, a security algorithm corresponding to the security protection requirement of the service requested; or
   the service request message comprises a security algorithm list that is corresponding to the security protection requirement of the service requested and supported by the user equipment, and the selecting of the security algorithm from the determinable security algorithm list supported by both the user equipment and the network entity comprises: selecting, by the network entity, a security algorithm from the security algorithm list corresponding to the security protection requirement of the service requested.

3. The method according to claim 1, wherein:
   after receiving the service request message sent by the user equipment, further comprising:
   returning, by the network entity, the security algorithm list supported by the network entity to the user equipment, so that according to the security protection requirement of service requested by the service request message, the user equipment selects a security algorithm from the determinable security algorithm list supported by both the user equipment and the network entity, and specifically comprising: the user equipment selects a security algorithm that is corresponding to the security protection requirement of the service requested from the determinable security algorithm list supported by both the user equipment and the network entity; or
   returning, by the network entity, to the user equipment the security algorithm list that is corresponding to the security protection requirement of the service requested and supported by the network entity, so that according to the security protection requirement of the service requested by the service request message, the user equipment selects a security algorithm from the determinable security algorithm list supported by both the user equipment and the network entity, and specifically comprising: the user equipment selects a security algorithm from the security algorithm list supported by the user equipment, and the security algorithm list that is corresponding to the security protection requirement of the service requested and supported by the network entity; or the user equipment selects a security algorithm from the security algorithm list that is corresponding to the security protection requirement of the service requested and supported by the user equipment, and the security algorithm list that is corresponding to the security protection requirement of the service requested and supported by the network entity; or
   returning, by the network entity, a security algorithm selection policy that is supported by the network entity to the user equipment, wherein the security algorithm selection policy is set based on the security algorithm list supported by the network entity, so that according to the security protection requirement of the service requested by the service request message, a security algorithm is selected from the determinable security algorithm list supported by both the user equipment and the network entity, and specifically comprising: according to the security algorithm selection policy, the user equipment selects a security algorithm corresponding to the security protection requirement of the service requested from the determinable security algorithm list supported by both the user equipment and the network entity; or returning, by the network entity, to the user equipment a security algorithm selection policy identifier used for identifying the security algorithm selection policy that is supported by the network entity, so that according to the security protection requirement of the service requested by the service request message, the user equipment selects a security algorithm from the determinable security algorithm list supported by both the user equipment and the network entity, and specifically comprising: the user equipment determines the security algorithm selection policy identified by the security algorithm selection policy identifier; and according to the security algorithm selection policy, the user equipment selects a security algorithm corresponding to the security protection requirement of the service requested from the determinable security algorithm list supported by both the user equipment and the network entity.

4. The method according to claim 1, wherein the selecting of the security algorithm from the determinable security algorithm list supported by both the user equipment and the network entity comprises:
  selecting a security algorithm from the determinable security algorithm list that is supported by both the user equipment and the network entity, and from a security algorithm list stored in an application server, wherein the security algorithms in the security algorithm list stored in the application server are settable based on different security protection requirements of services requested by service request messages.

5. The method according to claim 1, wherein:
the service request message comprises a security algorithm list selected by the user equipment, wherein the security algorithm list is selected by the user equipment from the security algorithm list supported by the user equipment, from a security algorithm list stored in an application server, and from one of the following supported by the application server: a security algorithm list, a security algorithm selection policy, or a security algorithm selection policy identifier which are corresponding to the security protection requirement of the service requested; and
the selecting of the security algorithm from the determinable security algorithm list supported by both the user equipment and the network entity further comprises:
  selecting, by the network entity, according to the security algorithm list in the service request message, a security algorithm corresponding to the security protection requirement of the service requested from the security algorithm list that is stored in the application server and supported by the user equipment, and the security algorithm list supported by the network entity; or
  selecting, by the network entity, a security algorithm corresponding to the security protection requirement of the service requested, according to the security algorithm list that is corresponding to the security protection requirement of the service requested and which is stored in the application server and supported by the user equipment, and according to the security algorithm list corresponding to the security protection requirement of the service requested and the security algorithm list that is supported by the network entity and corresponding to the security protection requirement of the service requested.

6. The method according to claim 1, wherein:
the service request message comprises the security algorithm list supported by the user equipment, or the security algorithm list corresponding to the security protection requirement of the service requested, and a security algorithm list stored in an application server, and one of the following supported by the application server: a security algorithm list, a security algorithm selection policy, or a security algorithm selection policy identifier which are corresponding to the security protection requirement of the service requested; and
the selecting of the security algorithm from the determinable security algorithm list supported by both the user equipment and the network entity further comprises:
  selecting, by the network entity, a security algorithm corresponding to the security protection requirement of the service requested according to:
    the security algorithm list supported by the user equipment; or
    the security algorithm list corresponding to the security protection requirement of the service requested and a security algorithm list stored in an application server and one of the following supported by the application server: a security algorithm list, a security algorithm selection policy, or a security algorithm selection policy identifier which are corresponding to the security protection requirement of the service requested, and according to the security algorithm list supported by the network; or
    the security algorithm list corresponding to the security protection requirement of the service requested in the service request message.

7. The method according to claim 1, wherein:
the service request message comprises the security algorithm list supported by the user equipment or a security algorithm list corresponding to the security protection requirement of the service requested by the service request message;
after receiving the service request message sent by the user equipment, further comprising: obtaining, by the network entity, a security algorithm list stored in an application server, and one of the following supported by the application server: a security algorithm list, a security algorithm selection policy, a security algorithm selection policy identifier which are corresponding to the security protection requirement of the service requested, wherein the security algorithm selection policy is set based on the security protection requirement of the service requested;
the selecting of the security algorithm further comprises:
  selecting, by the network entity, a security algorithm corresponding to the security protection requirement of the service requested from the security algorithm list that is stored in the application server, and supported by both the user equipment and the network entity; or
  selecting, by the network entity, according to the security algorithm selection policy stored in the application server, or the security algorithm selection policy identified by the security algorithm selection policy identifier, a security algorithm corresponding to the security protection requirement of the service requested from the security algorithm list that is corresponding to the security protection requirement of the service requested and which is stored in the application server and supported by both the user equipment and the network entity.

8. The method according to claim 4, wherein:
after receiving the service request message sent by the user equipment, further comprising:
returning, by the network entity, to the user equipment: the security algorithm list supported by the network entity, and a security algorithm list corresponding to the security protection requirement of the service requested, and one of the following supported by the application server: a security algorithm selection policy or a security algorithm selection policy identifier which are supported by the network entity, wherein the security algorithm selection policy is set based on the security algorithm list supported by the network entity, so that according to the security protection requirement of service requested by the service request message, the user equipment selects a security algorithm from the determinable security algorithm list supported by both the user equipment and the network entity,
the selecting of the security algorithm by user equipment specifically comprising: the user equipment selects a security algorithm corresponding to the security protection requirement of the service requested from the security algorithm list that is stored in the application server, and supported by both the user equipment and the network entity, and one of the following supported by the application server: the security algorithm list, the security algorithm selection policy, or the security algorithm selection policy identifier which are corresponding to the security protection requirement of the service requested, and the security algorithm list supported by the network entity, and the security algorithm list corresponding to the security protection requirement of the service requested, and one of the following supported by the application server: the security algorithm selection policy or the security algorithm selection policy identifier which are supported by the network entity, wherein the security algorithm selection policy is set based on the security protection requirement of the service requested.

9. The method according to claim 1, wherein the security protection requirement comprises one or more of:
a security protection level requirement or a security algorithm list, wherein the security protection level requirement or a security algorithm list is corresponding to a data type;
a security protection level requirement, or a security algorithm list, or a security algorithm policy, wherein the security protection level requirement, or the security algorithm list, or the security algorithm policy is corresponding to a service type; or
any one of or multiple of user requirements, wherein a security algorithm policy corresponding to the service type indicates a security protection level requirement of the service type under different conditions.

10. The method according to claim 1, wherein:
security capability of the user equipment comprises: providing different security protection algorithm lists supported by the user equipment for different data types or different security protection levels; and
security capability of the network entity comprises: providing security protection algorithm lists supported by the network entity for different data types or different security protection levels.

11. A user equipment configured to communicate with a network entity, comprising:
a storage module, configured to store a security algorithm list supported by the user equipment, wherein security algorithms in the security algorithm list for the user equipment are settable based on mappings between a security protection requirement and a service requested by a service request message of the user equipment; and
a hardware to operate:
an obtaining module, configured to obtain from the stored security algorithm list a security algorithm corresponding to a security protection requirement of a service requested by a service request message;
a sending module, configured to generate and send the service request message to the network entity, wherein the service request message comprises the security algorithm list obtained; and
a receiving module, configured to receive a security algorithm returned by the network entity, wherein the returned security algorithm is selected by the network entity according to the security protection requirement of the service requested by the service request message, from a security algorithm list determinable based on security algorithms supported by both the user equipment and the network entity for the service requested by the service request message.

12. The user equipment according to claim 11, wherein the obtaining module is further configured to obtain a security algorithm list stored in an application server, and one of the following supported by the application server: a security algorithm list, a security algorithm selection policy, or a security algorithm selection policy identifier which are corresponding to the security protection requirement of the service requested by the service request message, wherein the security algorithm selection policy is set based on the security protection requirement of the service requested, and the security algorithm list stored in the application server is settable based on different security protection requirements of services requested by service request messages; and
the service request message sent to the network entity comprises the security algorithm list obtained from the storage module, and one of the following supported by the application server: the security algorithm list, the security algorithm selection policy, or the security algorithm selection policy identifier obtained from the application server.

13. The user equipment according to claim 11, the obtaining module is further configured to:
obtain a security algorithm list stored in an application server, and one of the following supported by the application server: a security algorithm list, a security algorithm selection policy, or a security algorithm selection policy identifier which are corresponding to the security protection requirement of the service requested, wherein the security algorithm selection policy is set based on the security protection requirement of the service requested; and
select a security algorithm list that is stored in the application server and supported by the user equipment; or
select a security algorithm list corresponding to the security protection requirement of the service requested in the security algorithm list that is stored in the application server and supported by the user equipment, according to the security algorithm list obtained from the storage module, and one of the following supported by the application server: the security algorithm list, the security algorithm selection policy, or the security algorithm selection policy identifier obtained from the application server; and the security algorithm list in the service request message comprises the security algorithm list selected.

14. A network entity configured to communicate with a user equipment, comprising:
   a storage module, configured to store a security algorithm list or a security algorithm selection policy, wherein the security algorithm list or the security algorithm selection policy is supported by the network entity, security algorithms in the security algorithm list for the network entity are settable based on mappings between a security protection requirement and a service requested by a service request message of the user equipment; and
   a hardware to operate:
      a receiving module, configured to receive a service request message sent by the user equipment, wherein the service request message comprises a security algorithm list supported by the user equipment;
      a selecting module, configured to select a security algorithm corresponding to a security protection requirement of the service requested by the service request message from a security algorithm list determinable based on security algorithms supported by both the user equipment and the network entity for the service requested by the service request message, according to the security algorithm list in the service request message, and one of the following: the security algorithm list or the security algorithm selection policy for the network entity stored in the storage module; and
      a sending module, configured to send the security algorithm selected to the user equipment.

15. The network entity according to claim 14, wherein:
   the security algorithm list supported by the user equipment comprises a security algorithm list that is stored in an application server and supported by the user equipment, or a security algorithm list corresponding to the security protection requirement of the service requested by the service request message; and
   the selecting module selects a security algorithm corresponding to the security protection requirement of the service requested by the service request message, according to the security algorithm list in the service request message, and one of the following: the security algorithm list or the security algorithm selection policy for the network entity which are stored in the storage module.

16. The network entity according to claim 14, wherein:
   the service request message further comprises a security algorithm list stored in an application server, and one of the following supported by the application server: a security algorithm list, a security algorithm selection policy, or a security algorithm selection policy identifier which are corresponding to the security protection requirement of the service requested, wherein the security algorithm selection policy is set based on the security protection requirement of the service requested, and the security algorithms in the security algorithm list stored in the application server are settable based on different security protection requirements of services requested by service request messages; and
   the selecting module selects a security algorithm corresponding to the security protection requirement of the service requested, according to:
      the security algorithm list or the security algorithm selection policy for the network entity stored in the storage module, and
      the security algorithm list of the user equipment in the service request message, and the security algorithm list stored in the application server, and one of the following supported by the application server: the security algorithm list, the security algorithm selection policy, or the security algorithm selection policy identifier which are corresponding to the security protection requirement of the service requested.

17. The network entity according to claim 14, wherein:
   the security algorithm list in the service request message comprises a security algorithm list that is corresponding to the security protection requirement of the service requested, and supported by the user equipment; and
   the hardware further:
      an obtaining module, configured to obtain a security algorithm list stored in an application server, and one of the following supported by the application server: a security algorithm list, a security algorithm selection policy, or a security algorithm selection policy identifier which are corresponding to the security protection requirement of the service requested, wherein the security algorithm selection policy is set based on the security protection requirement of the service requested, and the security algorithms in the security algorithm list stored in the application server are settable based on different security protection requirements; and
      the selecting module selects a security algorithm corresponding to the security protection requirement of the service requested, according to:
         the security algorithm list or the security algorithm selection policy for the network entity stored in the storage module, and
         the security algorithm list in the service request message, and the security algorithm list stored in the application server, and one of the following supported by the application server: the security algorithm list, the security algorithm selection policy, or the security algorithm selection policy identifier which are corresponding to the security protection requirement of the service requested.

18. A user equipment configured to communicate with a network entity, comprising:
   a storage module, configured to store a security algorithm list supported by the user equipment, wherein security algorithms in the security algorithm list for the user equipment are settable based on mappings between a security protection requirement and a service requested by a service request message of the user equipment, and the security algorithm list is used for indicating security capability of the user equipment; and
   a hardware to operate:
      a sending module, configured to generate and send a service request message to a network entity;
      a receiving module, configured to receive one of the following: a security algorithm list, a security algorithm selection policy, or a security algorithm selection policy identifier which are returned by the network entity, wherein the security algorithm list is a security algorithm list supported by the network entity, or a security algorithm list corresponding to a security protection requirement of the service requested by the service request message; and the security algorithm selection policy is set based on the security algorithm list supported by the network entity; and a selecting module, configured to, according to the security algorithm list stored in the storage module and the security algorithm list received by the receiving module, select a security algorithm corresponding to the security protection requirement of the service requested from a security algorithm list determinable based on security algorithms supported by both the user equipment and the network entity for the service requested by the service request message.

19. The user equipment according to claim 18, further comprising:

an obtaining module, configured to: obtain a security algorithm list stored in an application server, and one of the following supported by the application server: a security algorithm list, a security algorithm selection policy, or a security algorithm selection policy identifier which are corresponding to the security protection requirement of the service requested, wherein the security algorithm selection policy is set based on the security protection requirement of the service requested; and the selecting module selects a security algorithm that is corresponding to the security protection requirement of the service requested and which is stored in the application server, and supported by both the user equipment and the network entity, according to:

the security algorithm list stored in the t storage module, and one of the following supported by the application server: the security algorithm list, the security algorithm selection policy, or the security algorithm selection policy identifier which are obtained from the application server by the user equipment, and one of the following supported by the application server: the security algorithm list, the security algorithm selection policy, or the security algorithm selection policy identifier which are received from the network entity.

20. A network entity configured to communicate with a user equipment, comprising:

a storage module, configured to store a security algorithm list, a security algorithm selection policy, or a security algorithm selection policy identifier, wherein the security algorithm list, the security algorithm selection policy, and the security algorithm selection policy identifier are supported by the network entity, the security algorithms in the security algorithm list for the network entity are settable based on mappings between a security protection requirement and a service requested by a service request message, and the security algorithm list is used for indicating security capability of the network entity; and the security algorithm selection policy is set based on the security algorithm list supported by the network entity; and a hardware to operate:

a receiving module, configured to receive a service request message sent by the user equipment; and a sending module, configured to send to the user equipment: the security algorithm list stored in the storage module, and one of the following: a security algorithm list, a security algorithm selection policy, or a security algorithm selection policy identifier which are corresponding to a security protection requirement of the service requested by the service request message from the user equipment.

21. The network entity according to claim 20, wherein the hardware further operates:

an obtaining module, configured to obtain a security algorithm list stored in an application server, and one of the following supported by the application server: a security algorithm list, a security algorithm selection policy, or a security algorithm selection policy identifier which are corresponding to the security protection requirement of the service requested, wherein the security algorithm selection policy is set based on the security protection requirement of the service requested, and the security algorithms in the security algorithm list stored in the application server are settable based on different security protection requirements of services requested by service request messages; and a selecting module, configured to select a security algorithm list that is stored in the application server and supported by the network entity, and one of the following supported by the network entity: the security algorithm list, the security algorithm selection policy, or the security algorithm selection policy identifier which are corresponding to the security protection requirement of the service requested and which are stored in the storage module, and the security algorithm list of the application server obtained, and one of the following supported by the application server: the security algorithm list, the security algorithm selection policy, or the security algorithm selection policy identifier which are corresponding to the security protection requirement of the service requested; and the sending module sends to the user equipment:

the security algorithm list or the security algorithm selection policy, wherein the security algorithm list or the security algorithm selection policy is stored in the storage module, and the security algorithm list of the application server obtained, and one of the following supported by the application server: the security algorithm list, the security algorithm selection policy, or the security algorithm selection policy identifier which are corresponding to the security protection requirement of the service requested; or the security algorithm list selected by the selecting module, and one of the following supported by the network entity: the security algorithm list, the security algorithm selection policy, or the security algorithm selection policy identifier which are corresponding to the security protection requirement of the service requested and selected by the selecting module.

* * * * *